(12) United States Patent
Ji et al.

(10) Patent No.: US 8,014,781 B2
(45) Date of Patent: Sep. 6, 2011

(54) INTRA-CELL COMMON REUSE FOR A WIRELESS COMMUNICATIONS SYSTEM

(75) Inventors: Tingfang Ji, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 10/969,540

(22) Filed: Oct. 20, 2004

(65) Prior Publication Data

US 2005/0272432 A1    Dec. 8, 2005

Related U.S. Application Data

(60) Provisional application No. 60/578,214, filed on Jun. 8, 2004.

(51) Int. Cl.
*H04W 40/00* (2009.01)

(52) U.S. Cl. ...... 455/449; 455/422.1; 455/447; 455/448; 455/450; 455/501; 455/509; 370/310.2; 370/319; 370/322; 370/328; 370/329

(58) Field of Classification Search ......... 455/436–438, 455/447, 449, 453, 442–445, 450–452.2, 455/448, 501, 509, 422.1; 370/329, 331, 370/333, 334, 310.2, 319, 322, 328
See application file for complete search history.

(56) References Cited

U.S. PATENT DOCUMENTS

| | | | | |
|---|---|---|---|---|
| 5,247,699 A | * | 9/1993 | Hartman | 455/447 |
| 5,276,907 A | * | 1/1994 | Meidan | 455/436 |
| 5,437,054 A | * | 7/1995 | Rappaport et al. | 455/447 |
| 5,551,060 A | * | 8/1996 | Fujii et al. | 455/447 |
| 5,586,170 A | * | 12/1996 | Lea | 455/452.1 |
| 5,640,676 A | * | 6/1997 | Garncarz et al. | 455/436 |
| 5,649,293 A | | 7/1997 | Reed | |
| 5,697,057 A | * | 12/1997 | Bursztejn et al. | 455/447 |
| 5,861,844 A | * | 1/1999 | Gilmore et al. | 342/374 |
| 5,956,642 A | * | 9/1999 | Larsson et al. | 455/449 |

(Continued)

FOREIGN PATENT DOCUMENTS

AU    199858302    9/1998

(Continued)

OTHER PUBLICATIONS

International Search Report, PCT/US2005/019167, International Searching Authority, European Patent Office, Rijswijk, Netherlands, Sep. 26, 2005.

(Continued)

*Primary Examiner* — Stephen M D'Agosta
(74) *Attorney, Agent, or Firm* — Kenneth Vu

(57) ABSTRACT

To avoid or reduce intra-cell interference, each sector of a cell is associated with a sector-specific set of system resources (e.g., subbands) and at least one non-overlapping common set of system resources. Each common set for each sector includes system resources observing little or no interference from at least one other sector in the cell. The channel condition for a terminal in a given sector x is ascertained based on forward and/or reverse link measurements for the terminal. The terminal is assigned system resources from a common set or a sector-specific set for sector x based on the terminal's channel condition. For example, if the terminal observes high interference from another sector y, then the terminal is assigned system resources from a common set that observes little or no interference from sector y. The techniques may be used for an OFDMA system that uses frequency hopping.

13 Claims, 12 Drawing Sheets

U.S. PATENT DOCUMENTS

| | | | |
|---|---|---|---|
| 6,038,450 A | 3/2000 | Brink et al. | |
| 6,119,011 A * | 9/2000 | Borst et al. | 455/452.2 |
| 6,243,367 B1 * | 6/2001 | Hussain | 370/329 |
| 6,445,926 B1 * | 9/2002 | Boch et al. | 455/447 |
| 6,553,019 B1 | 4/2003 | Laroia et al. | |
| 6,611,506 B1 * | 8/2003 | Huang et al. | 370/329 |
| 6,889,056 B2 * | 5/2005 | Shibutani | 455/522 |
| 6,898,431 B1 * | 5/2005 | Peele | 455/453 |

FOREIGN PATENT DOCUMENTS

| | | |
|---|---|---|
| CL | 2713-2004 | 8/2005 |
| CL | 2718-2004 | 8/2005 |
| EP | 0865220 A1 | 9/1998 |
| EP | 1043861 * | 11/2000 |
| FR | 2720574 | 12/1995 |
| WO | 9841049 | 9/1996 |

OTHER PUBLICATIONS

Written Opinion, PCT/US2005/019167, International Searching Authority, European Patent Office, Rijswijk, Netherlands, Sep. 26, 2005.

International Preliminary Examination Report- PCT/US05/019187, IPEA/US. Alexandria, VA, DOM: Mar. 20, 2008.

* cited by examiner

INTRA-CELL COMMON REUSE FOR A WIRELESS COMMUNICATIONS SYSTEM

CROSS-REFERENCE TO RELATED APPLICATION

This application claims priority to U.S. Provisional Patent Application Ser. No. 60/578,214, filed Jun. 8, 2004, which is incorporated herein by reference in its entirety.

BACKGROUND

I. Field

The present invention relates generally to communication, and more specifically to data transmission in a wireless communication system.

II. Background

A multiple-access system can concurrently support communication for multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This may be achieved by multiplexing the data transmissions on each link to be orthogonal to one another in time, frequency, and/or code domain. The orthogonality ensures that the data transmission for each terminal does not interfere with the data transmissions for other terminals.

A multiple-access system typically has many cells, where the term "cell" can refer to a base station and/or its coverage area depending on the context in which the term is used. To increase capacity, the coverage area of each base station may be partitioned into multiple (e.g., three) sectors by using appropriate antenna patterns. Each sector is served by a base transceiver subsystem (BTS). The BTSs for all sectors of the same cell are typically located within the base station for that cell, and these sectors are considered to be co-located. In general, the term "sector" can refer to a BTS and/or its coverage area depending on the context in which the term is used.

In a sectorized system, the sectors of each cell typically utilize the same frequency band. Data transmissions in each sector of a given cell then represent potential interference to data transmissions in other sectors of the same cell. Isolation of interference among the multiple sectors of the same cell is normally achieved by controlling the antenna pattern for each sector such that the antenna gain drops quickly outside of the intended coverage area for the sector. However, the edge of each sector typically overlaps the edges of adjoining sectors. A terminal that is located on the boundary between two sectors of the same cell may then observe high "intra-cell" interference from a neighboring sector. This interference may substantially degrade performance.

There is therefore a need in the art for techniques to mitigate the deleterious effects of intra-cell interference for terminals located on the boundaries between sectors of the same cell.

SUMMARY

Techniques to efficiently avoid or reduce intra-cell interference for terminals in a cell are described herein. These techniques are called "intra-cell common reuse" techniques and may be employed in various wireless communication systems and for both the forward and reverse links. With intra-cell common reuse, each sector of a cell is associated with a sector-specific set of system resources and at least one common set of system resources. The system resources may be frequency subbands, time slots, and so on. The sector-specific set for each sector is non-overlapping with, and includes system resources different from, the at least one common set for that sector. Each common set for each sector includes system resources observing little or no interference from at least one other sector in the cell. Different common sets may be defined for different embodiments of intra-cell common reuse, as described below.

To assign system resources to a terminal in a given sector x, the channel condition for the terminal is first ascertained based on, e.g., forward link measurements made by the terminal for different sectors and/or reverse link measurements made by different sectors for the terminal. The terminal is assigned system resources from a common set or a sector-specific set for sector x based at least on the terminal's channel condition. For example, if the terminal observes high interference from another sector y, then the terminal may be assigned system resources from a common set that observes little or no interference from sector y. The terminal may also be assigned resources from this common set if the terminal is in "softer" handoff and communicating with both sectors x and y. In any case, data transmission for the terminal is sent on the forward and/or reverse link using the assigned system resources.

Intra-cell common reuse may be used for an orthogonal frequency division multiple access (OFDMA) system that utilizes orthogonal frequency division multiplexing (OFDM). For the OFDMA system, each common set and each sector-specific set includes multiple frequency subbands, and the terminal may be assigned one or more frequency subbands for data transmission. For a frequency hopping OFDMA (FH-OFDMA) system, multiple orthogonal FH patterns may be formed for each common set and each sector-specific set. The terminal may be assigned one FH pattern from one set for data transmission.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The intra-cell common reuse techniques described herein may be used for various wireless multi-access communication systems. For clarity, these techniques are described for an OFDMA system that utilizes OFDM. OFDM effectively partitions the overall system bandwidth into multiple (N) orthogonal frequency subbands, which are also referred to as tones, sub-carriers, bins, frequency channels, and so on. Each subband is associated with a respective sub-carrier that may be modulated with data.

Figure 1:
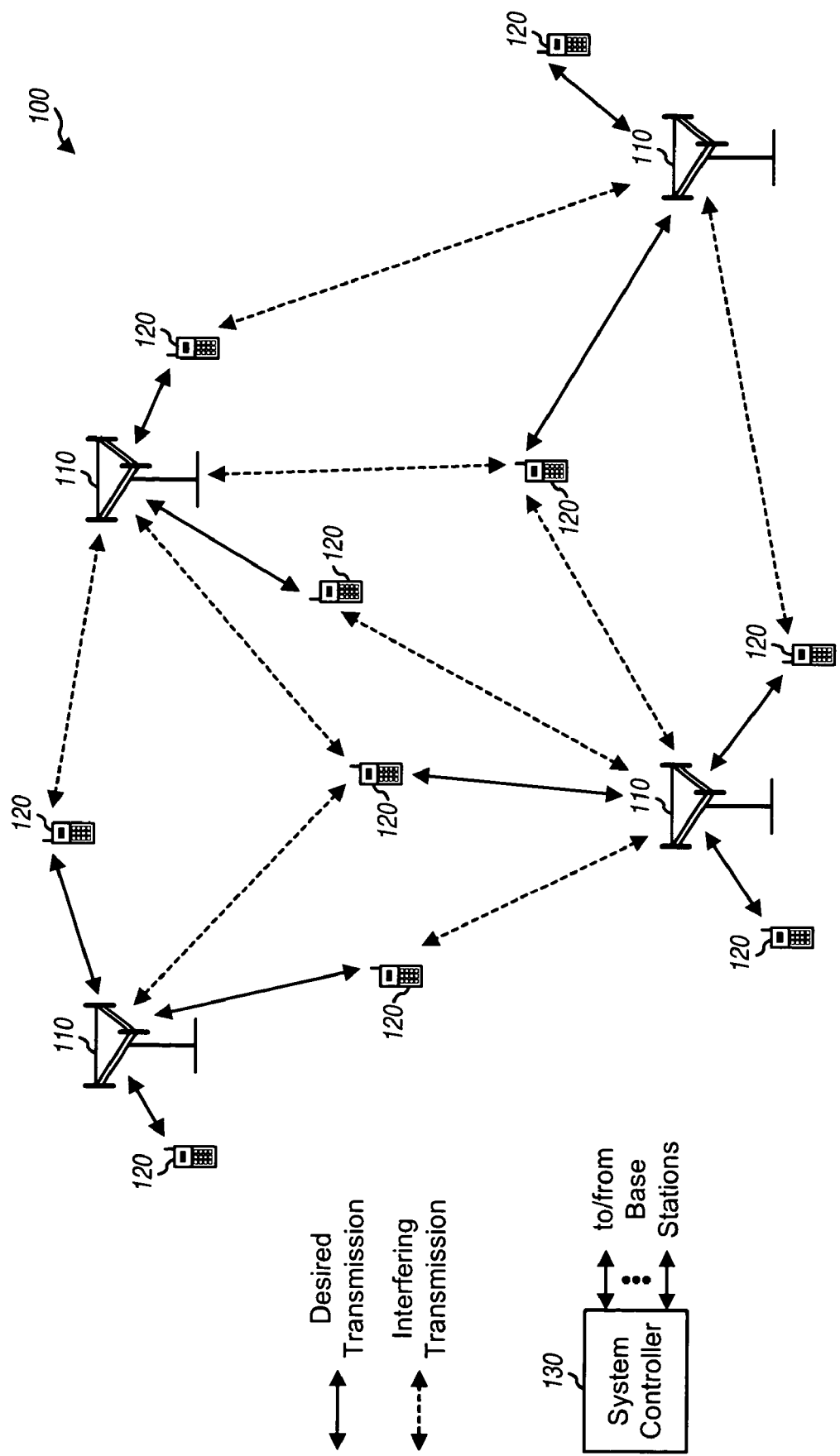
FIG. 1 shows a wireless communication system.

FIG. 1 shows an exemplary OFDMA system 100 with a number of base stations 110 that support communication for a number of wireless terminals 120. A base station is a fixed station used for communicating with the terminals and may also be called an access point, a Node B, or some other terminology. Terminals 120 are typically dispersed throughout the system, and each terminal may be fixed or mobile. A terminal may also be called a mobile station, a user equipment (UE), a wireless communication device, or some other terminology. Each terminal may communicate with one or possibly multiple base stations on the forward and reverse links at any given moment. For a centralized architecture, a system controller 130 couples to the base stations and provides coordination and control for these base stations. For a distributed architecture, the base stations may communicate with one another as needed, e.g., to serve the terminals, coordinate usage of system resources, and so on.

Each base station 110 provides communication coverage for a respective geographic area. The coverage area of each base station may be partitioned into multiple (e.g., three) sectors by use of directional antenna patterns.

Figure 2:
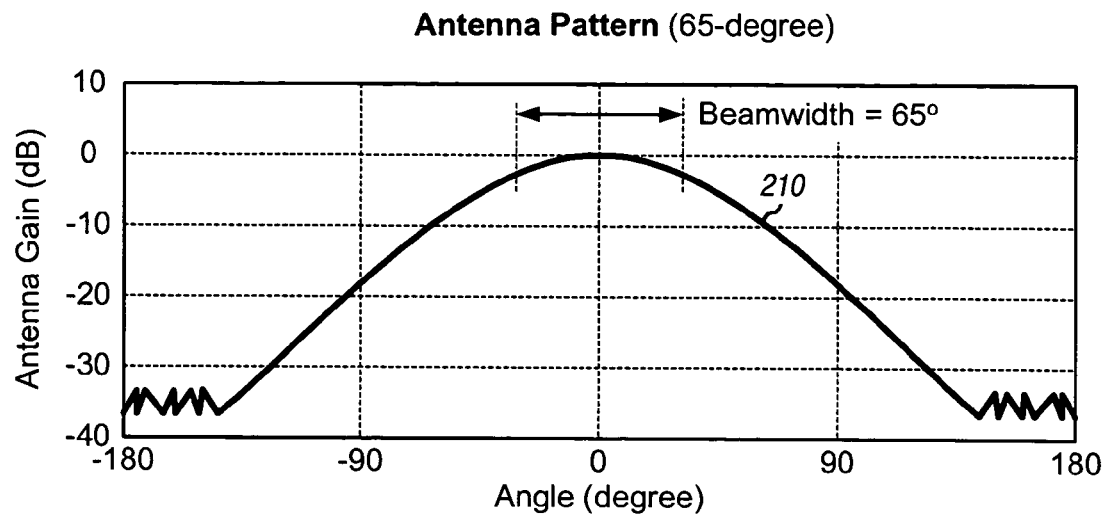
FIG. 2 shows an exemplary antenna pattern for a sector.

FIG. 2 shows an exemplary antenna pattern 210 used for a sector. The antenna pattern shows normalized antenna gains at different angular positions, where the normalization is such that the maximum antenna gain is 0 decibel (dB). Antenna pattern 210 has one main lobe with a −3 dB beamwidth of approximately 65 degrees.

Figure 3A:
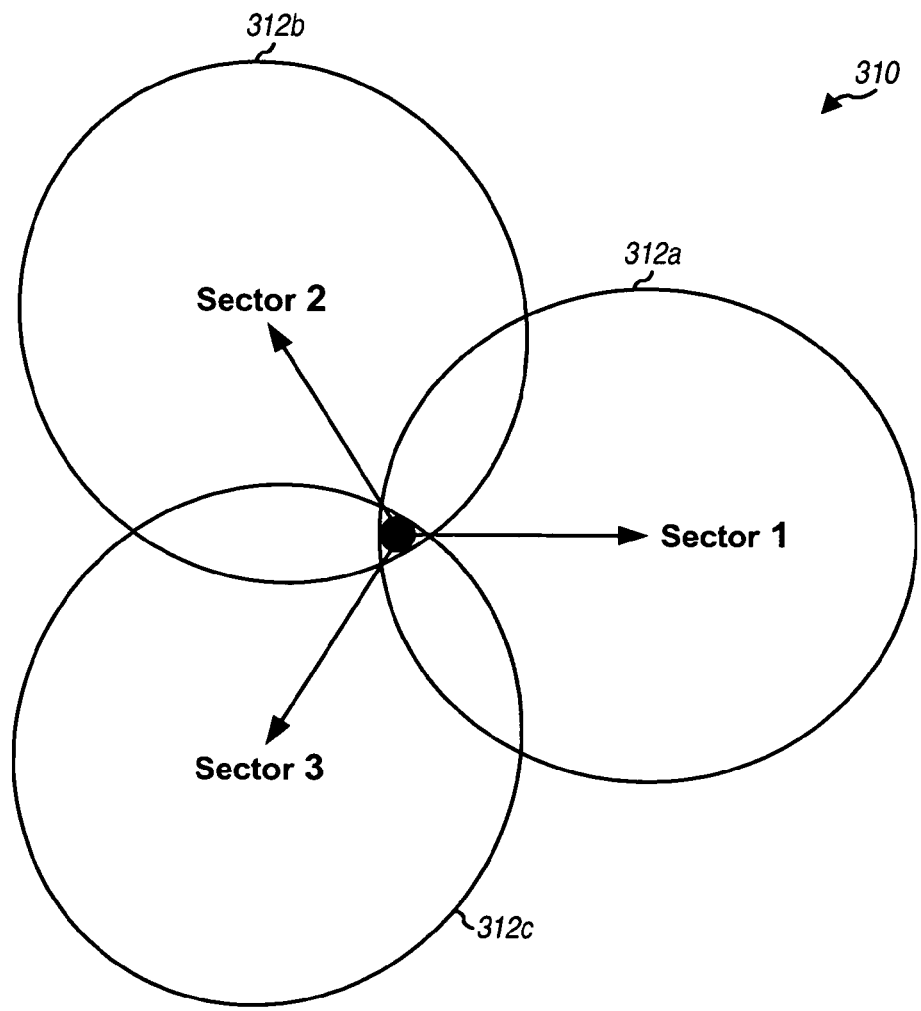
FIG. 3A shows a cell with three sectors.

FIG. 3A shows a cell 310 with three sectors 312a, 312b and 312c, which are labeled as sectors 1, 2 and 3, respectively. Each sector may be defined by a respective antenna pattern 210. The main lobes of the three antenna patterns for the three sectors may point at a horizontal angle of 120° apart from each other. By using an appropriate antenna pattern, interference isolation between the three sectors is good for the majority of users in these sectors.

Figure 3B:
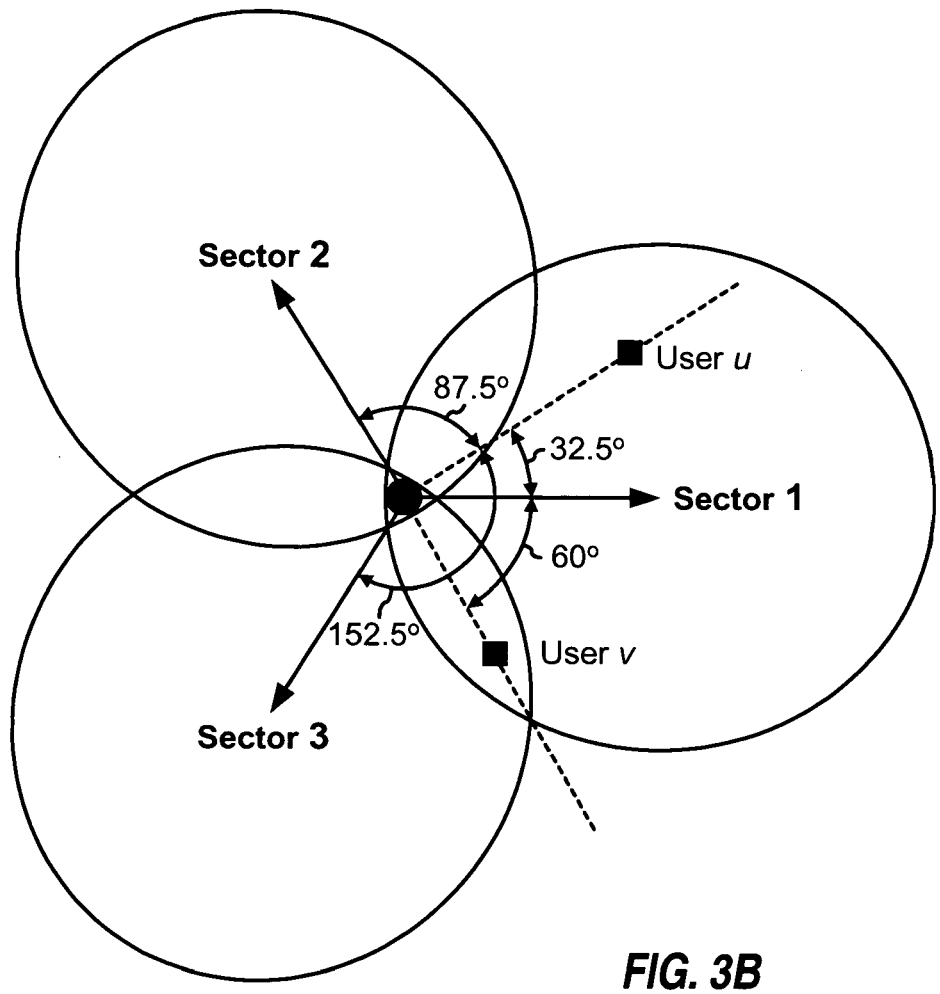
FIG. 3B shows intra-cell interference observed by two users in the cell.

FIG. 3B shows intra-cell interference observed by two users u and v in cell 310, which uses the 65° antenna pattern shown in FIG. 2. User u is located at 32.5° horizontal angle from sector 1 and has an antenna gain of −3 dB for sector 1. User u also has an antenna gain of −18 dB for sector 2, which is at 87.5° horizontal angle, and an antenna gain of −31 dB for sector 3, which is at 152.5° horizontal angle. The intra-cell interference observed by user u from both sectors 2 and 3 is 14.8 dB below the desired signal level from sector 1. User v is located at 60° horizontal angle from sector 1 and is on the boundary between sectors 1 and 3. It can be shown that the intra-cell interference observed by user v is higher than the desired signal level.

In general, the coverage area of each base station may be of any size and shape and may be dependent on various factors such as terrain, obstructions, and so on. The size and shape of each sector are dependent on the antenna pattern for that sector as well as other factors. The sectors of a cell typically overlap at the edges to ensure good communication coverage for the cell and to facilitate handoff between sectors. A cell/sector may or may not be a contiguous region, and the cell/sector edge may be quite complex.

Each sector is typically served by a BTS. The BTSs for all sectors of the same cell are typically located within the base station for that cell. For simplicity, in the following description, the term "base station" is used generically for both a fixed station that serves a cell and a fixed station that serves a sector. A "serving" base station or "serving" sector is one with which a terminal communicates. The terms "terminal" and "user" are also used interchangeably herein.

In the OFDMA system, users with different channel conditions may be distributed throughout each cell. These users may have different contribution and tolerance to intra-cell interference. The channel condition for each user may be quantified by received pilot strength, received pilot power, channel gain, signal-to-interference-and-noise ratio (SINR), and/or some other measurement for one or more sectors. A user located at the boundary of a sector (or simply, a "sector-edge user") typically has poor channel condition, e.g., a low SINR for the serving sector due to a low channel gain for this sector, high intra-cell interference, and so on. The sector-edge user is generally less tolerant to intra-cell interference, causes more interference to other users in the adjoining sectors, has poor performance, and may be a bottleneck in a system that imposes a fairness requirement.

The intra-cell common reuse techniques can avoid or reduce interference observed by sector-edge users. With intra-cell common reuse, a user u located on the boundary of multiple sectors is assigned subbands that are orthogonal to those assigned to other users in these sectors. User u would then observe little or no intra-cell interference from these other users and would be able to achieve improved performance. Various embodiments of intra-cell common reuse are described below.

Figure 4:
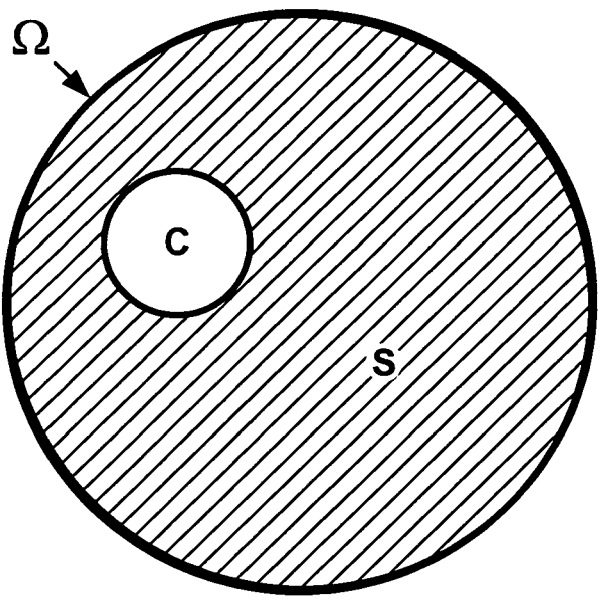
FIG. 4 shows a common set and a sector-specific set for a first embodiment of intra-cell common reuse.

FIG. 4 shows a Venn diagram of a common set of subbands and a sector-specific set of subbands, in accordance with a first embodiment of intra-cell common reuse. The common set is labeled as C and is represented by a circle with white fill. The sector-specific set is labeled as S and is represented by the area with diagonal hashing. Common set C contains subbands that are common for all sectors of a cell. Sector-specific set S contains subbands that may be assigned by each sector to its users. The subbands in sets C and S are taken from a full set of all subbands usable for data transmission. Common set C and sector-specific set S are non-overlapping (i.e., disjoint or mutually exclusive) in that each usable subband belongs in only set C or S.

The common and sector-specific sets may be defined as:

$$S = \Omega \backslash C \text{ and } S \cap C = \Theta, \qquad \text{Eq (1)}$$

where "\" denotes a difference set operation.

"∩" denotes an intersection set operation;

Ω denotes the full set containing all usable subbands; and

Θ denotes a null/empty set.

Common set C contains subbands selected from among the N total subbands in the system. To achieve frequency diversity, the subbands in common set C may be distributed across the N total subbands, as described below. Sector-specific set S may be formed by a difference set operation between the full set Ω and common set C. The size of the common set may be selected based on various factors such as, e.g., the expected number of sector-edge users, the desired overall spectral efficiency for the cell, and so on. The common set size may be selected to achieve efficient use of the system bandwidth while providing interference reduction for a significant number of users.

Each sector may assign the subbands in sector-specific set S to its users that observe good or fair channel conditions. The subbands in common set C may be assigned to weak users observing poor channel conditions. One sector in the cell or the cell itself may be designated to assign the subbands in common set C to all weak users in the cell. Each subband in the common set is assigned to only one user in the cell. Since sets C and S are non-overlapping, the weak users assigned with subbands in common set C would observe little or no intra-cell interference from other users assigned with the subbands in sector-specific set S.

Each sector may have strong users with good channel conditions and achieving high SINRs. These strong users may be adequately served with low-power transmissions on the forward and/or reverse links. Each sector may assign its strong users with subbands in common set C and may control or restrict usage on these subbands to avoid causing excessive interference to weak users assigned with these subbands. For example, data transmissions for strong users on the subbands in the common set may be constrained to be below a predetermined transmit power limit.

Common set C may be used to support users in "softer" handoff. Softer handoff refers to a process whereby a user concurrently communicates with multiple sectors of the same cell. Softer handoff can provide diversity gain due to data transmission or reception via different signal paths to multiple sectors. Softer handoff may be supported on the forward link, the reverse link, or both links.

If a given user u is assigned subbands in common set C, then the forward link traffic/packet data for user u may be transmitted from one or more sectors in the same cell. If the traffic data is transmitted from a single sector, then the subbands assigned to user u may be reused in other sector(s), provided that sufficient interference isolation can be achieved for user u from other user(s) assigned with the same subbands. If the traffic data for user u is transmitted from multiple sectors for softer handoff, then user u benefits from diversity gain achieved via the multiple transmissions.

If user u is transmitting on the reverse link, then the reverse link data transmission from user u may be received and decoded by one or more sectors in the same cell. Since the sectors are co-located, soft-decision symbols obtained by these sectors for user u may be combined and then decoded to improve decoding performance. This is commonly called joint decoding. If joint decoding is performed, then user u benefits from diversity gain achieved by multiple sectors receiving the reverse link transmission from user u. If joint decoding is not performed, then the subbands assigned to user u may be reused in other sector(s). The other user(s) assigned with the same subbands assigned to user u may be operated to cause negligible interference to user u on the reverse link.

Referring back to FIG. 3B, user v is located on the boundary between sectors 1 and 3 and may observe little interference from sector 2. Similarly, a user located on the boundary between sectors 1 and 2 may observe little interference from sector 3, and a user located on the boundary between sectors 2 and 3 may observe little interference from sector 1. Improved bandwidth utilization may be achieved by defining common sets for pairs of sectors instead of all sectors.

Figure 5A:
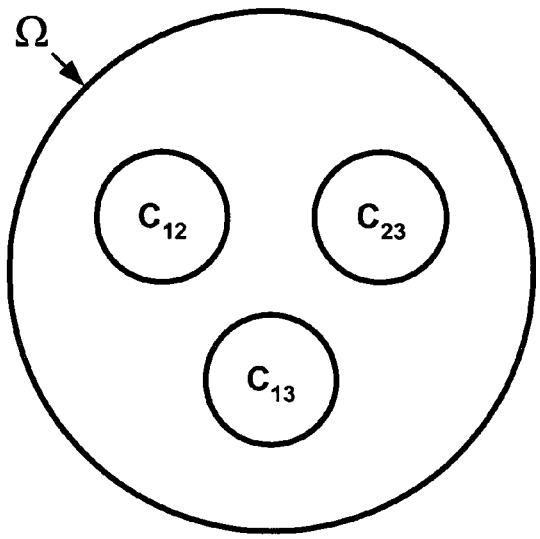
FIGS. 5A through 5D show three common sets and three sector-specific sets for a second embodiment of intra-cell common reuse.

FIG. 5A shows a Venn diagram of three common subband sets, which are labeled as $C_{12}$, $C_{13}$ and $C_{23}$, in accordance with a second embodiment of intra-cell common reuse. For this embodiment, the three common sets do not overlap one another. Common set $C_{12}$ contains subbands that are common for sectors 1 and 2 of the same cell, common set $C_{13}$ contains subbands that are common for sectors 1 and 3, and common set $C_{23}$ contains subbands that are common for sectors 2 and 3.

For each sector x, a sector-specific set $S_x$ may be defined for sector x to be non-overlapping with the two common sets $C_{xy}$ and $C_{xz}$ for sector x, where $x \in \{1, 2, 3\}$, $y \in \{1, 2, 3\}$, $z \in \{1, 2, 3\}$, $x \neq y$, $x \neq z$, and $y \neq z$. Sector-specific set $S_x$ may contain all usable subbands that are not included in common sets $C_{xy}$ and $C_{xz}$. The common and sector-specific sets for sector x may be defined as:

$$S_x = \Omega \setminus (C_{xy} \cup C_{xz}) \text{ and } C_{xy} \cap C_{xz} \cap C_{yz} = \Theta. \quad \text{Eq (2)}$$

Figure 5B:
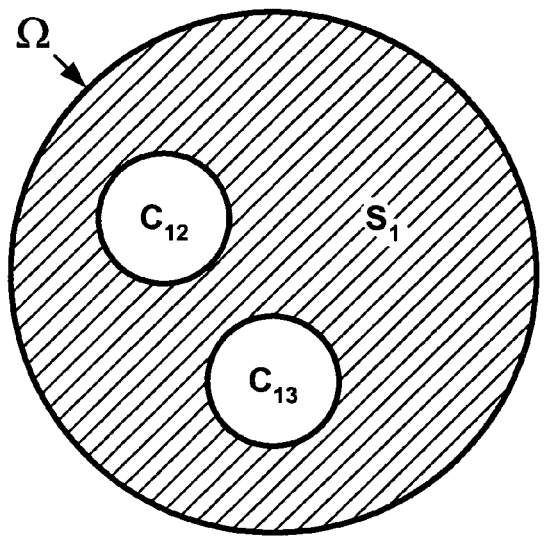

FIG. 5B shows a Venn diagram of common sets $C_{12}$ and $C_{13}$ and sector-specific set $S_1$ for sector 1. Common sets $C_{12}$ and $C_{13}$ are each represented by a circle with white fill. Sector-specific set $S_1$ is represented by the area with diagonal hashing. Sector-specific set $S_1$ contains all subbands in the full set Ω that are not in common sets $C_{12}$ and $C_{13}$. Sector 1 may assign the subbands in sector-specific set $S_1$ to strong and fair users located in the sector and observing good or fair channel conditions.

Figure 5C:
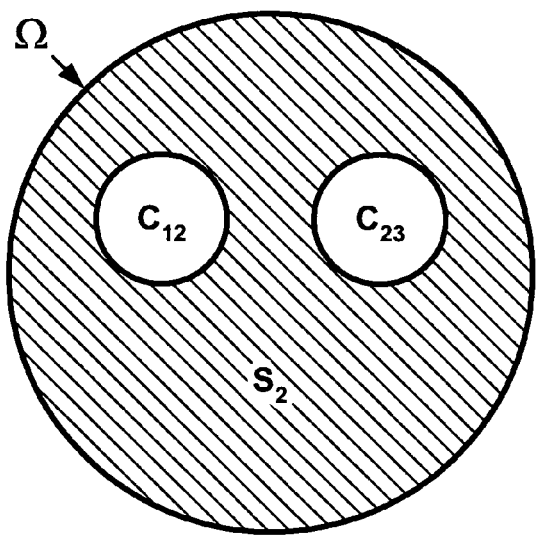

FIG. 5C shows a Venn diagram of common sets $C_{12}$ and $C_{23}$ and sector-specific set $S_2$ for sector 2. Sector-specific set $S_2$ contains all subbands in the full set Ω that are not in common sets $C_{12}$ and $C_{23}$. Sector 2 may assign the subbands in sector-specific set $S_2$ to strong and fair users in the sector.

Figure 5D:
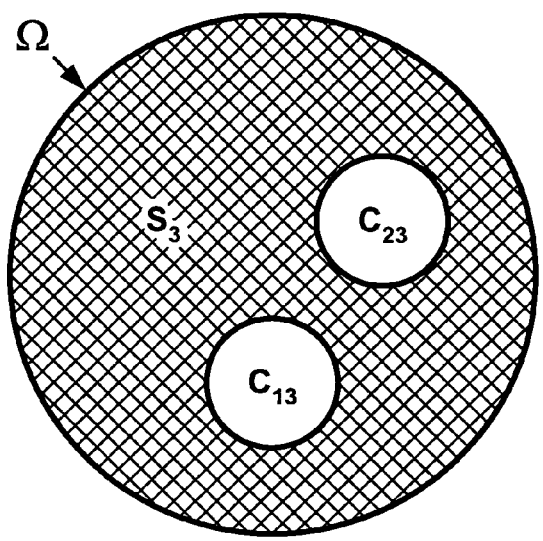

FIG. 5D shows a Venn diagram of common sets $C_{13}$ and $C_{23}$ and sector-specific set $S_3$ for sector 3. Sector-specific set $S_3$ contains all subbands in the full set Ω that are not in common sets $C_{13}$ and $C_{23}$. Sector 3 may assign the subbands in sector-specific set $S_3$ to strong and fair users in the sector.

For FIGS. 5B through 5D, the subbands in common set $C_{12}$ may be assigned to weak users located on the boundary between sectors 1 and 2. The subbands in common set $C_{13}$ may be assigned to weak users located on the boundary between sectors 1 and 3. The subbands in common set $C_{23}$ may be assigned to weak users located on the boundary between sectors 2 and 3.

For the second embodiment of intra-cell common reuse, the subbands in common set $C_{xy}$ are orthogonal to the subbands in sector-specific sets $S_x$ and $S_y$. Thus, a weak user located on the boundary between sectors x and y may be assigned subbands in common set $C_{xy}$ and would then observe little or no intra-cell interference from other users assigned with the subbands in sector-specific sets $S_x$ and $S_y$. The second embodiment of intra-cell common reuse can also improve bandwidth utilization. The subbands in common set $C_{xy}$ are included in sector-specific set $S_z$ and may be assigned to strong and fair users in sector z.

In an alternative second embodiment, a sector-specific set $S_{123}$ is defined to contain all subbands in the full set $\Omega$ that are not included in the three common sets $C_{12}$, $C_{13}$ and $C_{23}$, as follows:

$$S_{123} = \Omega \backslash (C_{12} \cup C_{13} \cup C_{23}). \quad \text{Eq (3)}$$

Each sector x may assign the subbands in sector-specific set $S_{123}$ to its strong and fair users. The subbands in common set $S_{xy}$ may be assigned to weak users located on the boundary between sectors x and y, and the subbands in common set $S_{xz}$ may be assigned to weak users located on the boundary between sectors x and z. Sector x may assign the subbands in common set $S_{yz}$ to strong users that will cause negligible interference to weak users located on the boundary between sectors y and z and assigned with the subbands in this common set $S_{yz}$.

A user may potentially observe high interference from two other sectors. Common sets may be defined to serve such a disadvantaged user while achieving good bandwidth utilization.

Figure 6A:
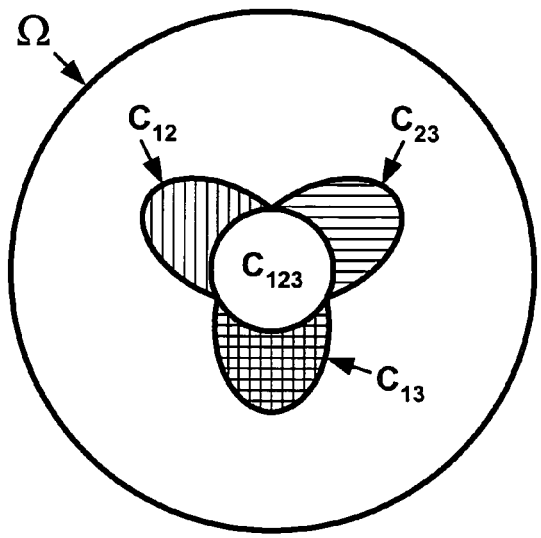
FIGS. 6A through 6D show four common sets and three sector-specific sets for a third embodiment of intra-cell common reuse.

FIG. 6A shows a Venn diagram of four common subband sets $C_{12}$, $C_{13}$, $C_{23}$ and $C_{123}$, in accordance with a third embodiment of intra-cell common reuse. Common set $C_{12}$ contains subbands that are common for sectors 1 and 2 of the same cell, common set $C_{13}$ contains subbands that are common for sectors 1 and 3, common set $C_{23}$ contains subbands that are common for sectors 2 and 3, and common set $C_{123}$ contains subbands that are common for all three sectors 1, 2 and 3.

For each sector x, a sector-specific set $S_x$ may be defined for sector x to be non-overlapping with the three common sets $C_{xy}$, $C_{xz}$ and $C_{xyz}$ for sector x. Sector-specific set $S_x$ may contain all usable subbands that are not included in common sets $C_{xy}$, $C_{xz}$ and $C_{xyz}$. The common and sector-specific sets for sector x may be defined as:

$$S_x = \Omega \backslash (C_{xy} \cup C_{xz} \cup C_{xyz}) \text{ and } C_{xy} \cap C_{xz} \cap C_{yz} \cap C_{xyz} = \Theta. \quad \text{Eq (4)}$$

Figure 6B:
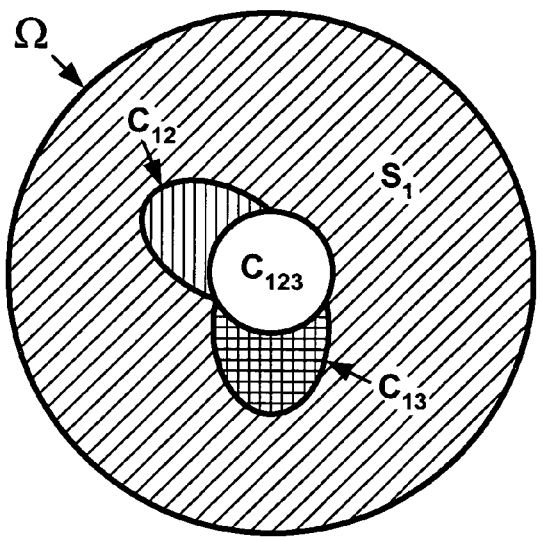

FIG. 6B shows a Venn diagram of common sets $C_{12}$, $C_{13}$ and $C_{123}$ and sector-specific set $S_1$ for sector 1. Common set $C_{12}$ is represented by the area with vertical lines, common set $C_{13}$ is represented by the area with grids, common set $C_{123}$ is represented by a circle with white fill, and sector-specific set $S_1$ is represented by the area with diagonal hashing. Sector-specific set $S_1$ contains all subbands in the full set $\Omega$ that are not included in common sets $C_{12}$, $C_{13}$, and $C_{123}$. Sector 1 may assign the subbands in sector-specific set $S_1$ to strong and fair users in the sector.

Figure 6C:
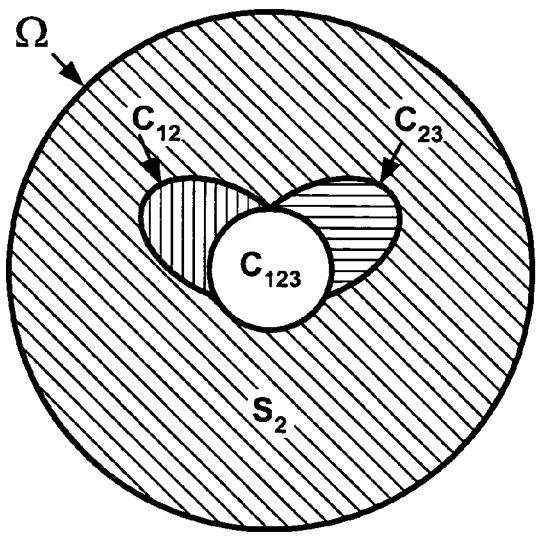

FIG. 6C shows a Venn diagram of common sets $C_{12}$, $C_{23}$ and $C_{123}$ and sector-specific set $S_2$ for sector 2. Sector-specific set $S_2$ contains all subbands in the full set $\Omega$ that are not included in common sets $C_{12}$, $C_{23}$ and $C_{123}$. Sector 2 may assign the subbands in sector-specific set $S_2$ to strong and fair users in the sector.

Figure 6D:
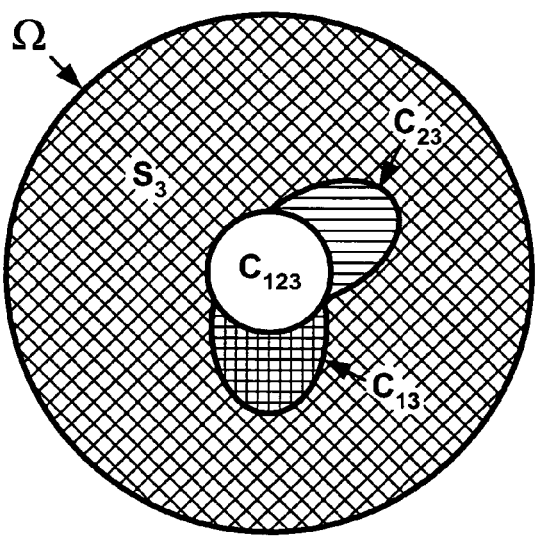

FIG. 6D shows a Venn diagram of common sets $C_{13}$, $C_{23}$ and $C_{123}$ and sector-specific set $S_3$ for sector 3. Sector-specific set $S_3$ contains all subbands in the full set $\Omega$ that are not included in common sets $C_{13}$, $C_{23}$ and $C_{123}$. Sector 3 may assign the subbands in sector-specific set $S_3$ to strong and fair users in the sector.

For FIGS. 6B through 6D, the subbands in common set $C_{12}$ may be assigned to weak users located on the boundary between sectors 1 and 2. The subbands in common set $C_{13}$ may be assigned to weak users located on the boundary between sectors 1 and 3. The subbands in common set $C_{23}$ may be assigned to weak users located on the boundary between sectors 2 and 3. The subbands in common set $C_{123}$ may be assigned to weak users located on the boundary between all three sectors 1, 2 and 3.

For the third embodiment of intra-cell common reuse, the subbands in common set $C_{xy}$ are orthogonal to the subbands in sector-specific sets $S_x$ and $S_y$. A weak user located on the boundary between sectors x and y may be assigned subbands in common set $C_{xy}$ and would then observe little or no intra-cell interference from other users that are assigned the subbands in sector-specific set $S_x$ and $S_y$. The subbands in common set $C_{xyz}$ are orthogonal to the subbands in sector-specific sets $S_x$, $S_y$ and $S_z$. A weak user located on the boundary between all three sectors x, y and z may be assigned subbands in common set $C_{xyz}$ and would then observe little or no intra-cell interference from other users that are assigned subbands in sector-specific set $S_x$, $S_y$ and $S_z$. The third embodiment can also improve bandwidth utilization. The subbands in common set $C_{xy}$ are included in sector-specific set $S_z$ and may be assigned to strong and fair users in sector z. Sector x may also assign the subbands in common set $S_{yz}$ to strong users that will cause negligible interference to weak users located on the boundary between sectors y and z and also assigned with the subbands in set $S_{yz}$.

Figure 7:
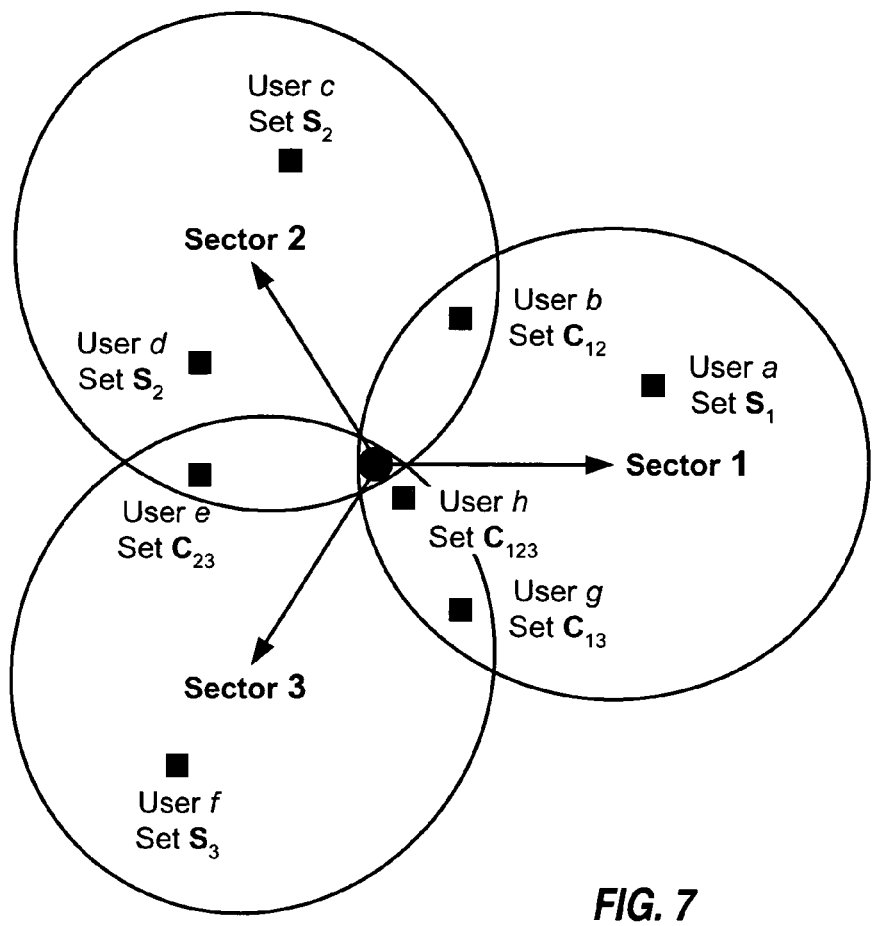
FIG. 7 shows a distribution of eight users in the three sectors of the cell.

FIG. 7 shows an example distribution of eight users in three sectors of a single cell. FIG. 7 also shows the assignment of subbands based on the third embodiment of intra-cell common reuse. In this example, user a is located in sector 1 and is assigned subbands from sector-specific set $S_1$. User b is located between sectors 1 and 2 and is assigned subbands from common set $C_{12}$. Users c and d are located in sector 2 and are assigned subbands from sector-specific set $S_2$. User e is located between sectors 2 and 3 and is assigned subbands from common set $C_{23}$. User f is located in sector 3 and is assigned subbands from sector-specific set $S_3$. User g is located between sectors 1 and 3 and is assigned subbands from common set $C_{13}$. User h is located between sectors 1, 2 and 3 and is assigned subbands from common set $C_{123}$.

The common and sector-specific sets may be formed in various manners. For an OFDMA system, N total subbands created by OFDM are available. All or a subset of the N total subbands may be used to transmit traffic data, pilot, and signaling. Typically, some subbands are not used for transmission and serve as guard subbands to allow the system to meet spectral mask requirements. For simplicity, the following description assumes that all N total subbands are usable for transmission, i.e., there are no guard subbands.

Figure 8A:
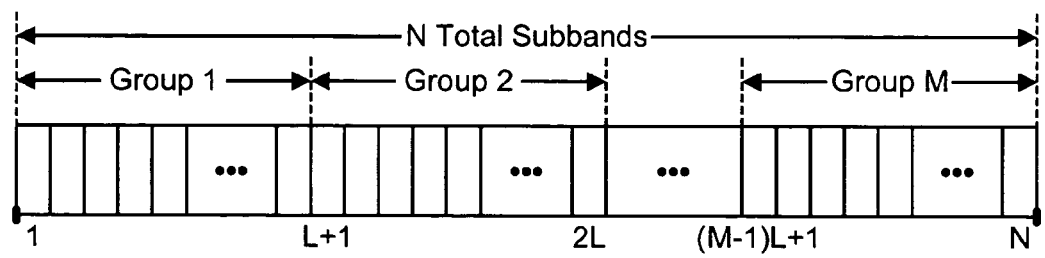
FIGS. 8A, 8B and 8C show formation of the common and sector-specific sets for the first, second, and third embodiments, respectively, of intra-cell common reuse.
Figure 8A:
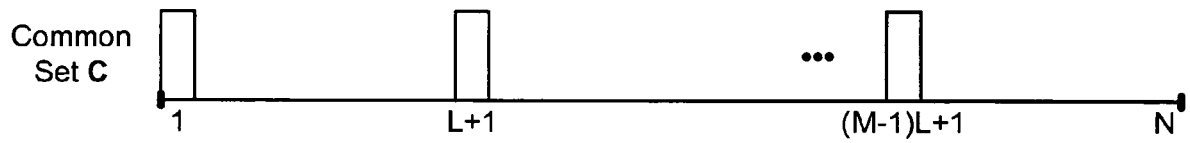
Figure 8A:
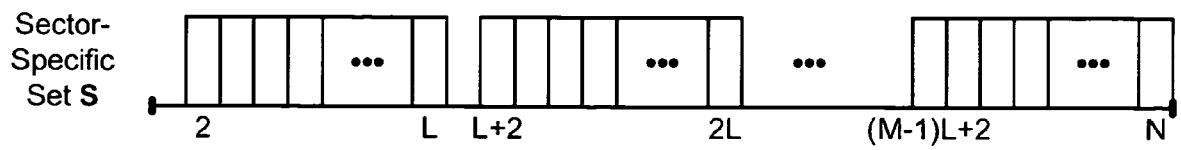

FIG. 8A shows an example for forming common set C and sector-specific set S for the first embodiment of intra-cell common reuse. In this example, the N total subbands are arranged into M groups, with each group containing L subbands, where $M \geq 1$, $L > 1$, and $M \cdot L = N$. Common set C contains one (e.g., the first) subband in each group. Sector-specific set S contains the remaining subbands in each group. In general, the common set may contain any number of subbands and any one of the N total subbands. To obtain frequency diversity, the common set may contain subbands taken from across the N total subbands. The subbands in the common set may be distributed across the N total subbands based on a predetermined pattern (e.g., as shown in FIG. 8A) or pseudo-randomly distributed across the N total subbands.

Figure 8B:
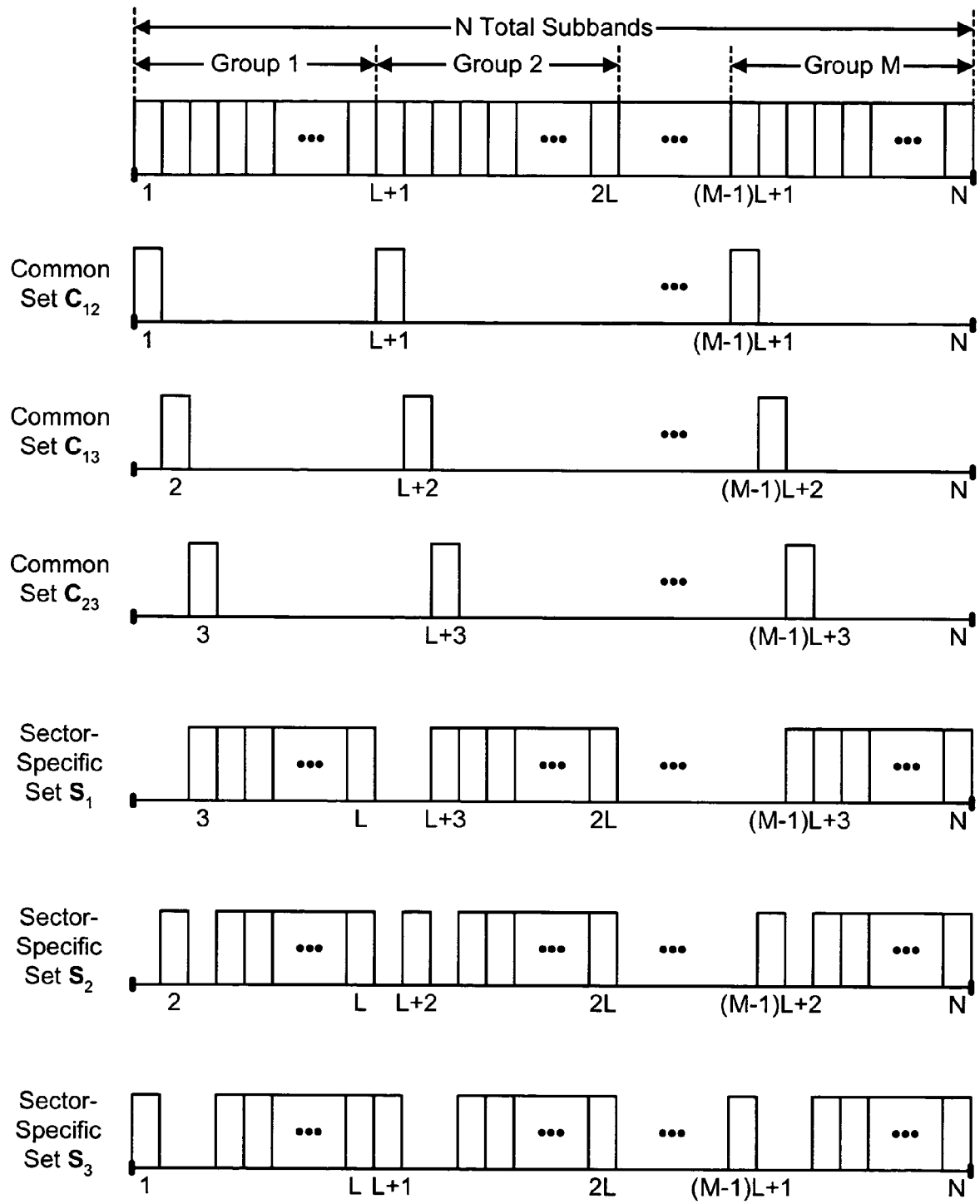

FIG. 8B shows an example for forming common sets $C_{12}$, $C_{13}$ and $C_{23}$ and sector-specific sets $S_1$, $S_2$ and $S_3$ for the second embodiment of intra-cell common reuse. In this example, the N total subbands are arranged into M groups, as described above for FIG. 8A. Common set $C_{12}$ contains the first subband in each group, common set $C_{13}$ contains the second subband in each group, and common set $C_{23}$ contains the third subband in each group. In general, each common set may contain any number of subbands and any one of the N total subbands, subject to the constraint that no two common sets contain the same subband. The common sets may contain the same number of subbands (as shown in FIG. 8B) or different numbers of subbands. The number of subbands in each common set may be dependent on various factors such as, e.g., the expected number of weak users assigned with the common set. To obtain frequency diversity, each common set may contain subbands taken from across the N total subbands (e.g., uniformly or pseudo-randomly distributed across the N total subbands).

Sector-specific set $S_1$ contains all usable subbands that are not included in common sets $C_{12}$ and $C_{13}$. Sector-specific set $S_2$ contains all usable subbands that are not included in common sets $C_{12}$ and $C_{23}$. Sector-specific set $S_3$ contains all usable subbands that are not included in common sets $C_{13}$ and $C_{23}$.

Figure 8C:
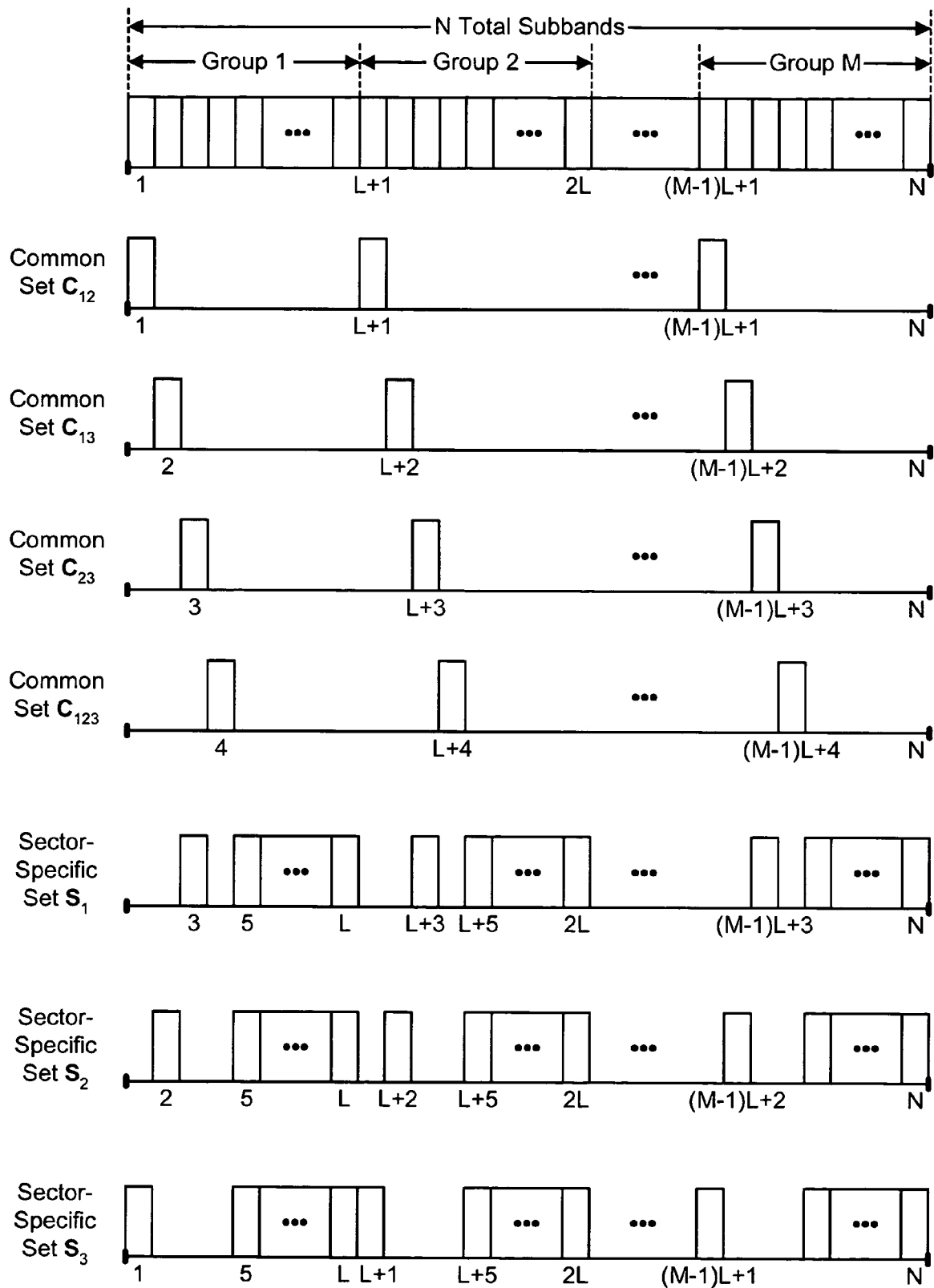

FIG. 8C shows an example for forming common sets $C_{12}$, $C_{13}$, $C_{23}$ and $C_{123}$ and sector-specific sets $S_1$, $S_2$ and $S_3$ for the third embodiment of intra-cell common reuse. In this example, the N total subbands are arranged into M groups, as described above for FIG. 8A. Common set $C_{12}$ contains the first subband in each group, common set $C_{13}$ contains the second subband in each group, common set $C_{23}$ contains the third subband in each group, and common set $C_{123}$ contains the fourth subband in each group. In general, each common set may contain any number of subbands and any one of the N total subbands, subject to the constraint that no two common sets contain the same subband. Sector-specific set $S_1$ contains all usable subbands that are not included in common sets $C_{12}$, $C_{13}$ and $C_{123}$. Sector-specific set $S_2$ contains all usable subbands that are not included in common sets $C_{12}$, $C_{23}$ and $C_{123}$. Sector-specific set $S_3$ contains all usable subbands that are not included in common sets $C_{13}$, $C_{23}$ and $C_{123}$.

The common and sector-specific sets may be defined in various manners. In one embodiment, the common and sector-specific sets are static and do not change or change at a slow rate. In another embodiment, the common and sector-specific sets may be dynamically defined based on sector loading and possibly other factors. For example, the common set(s) for each sector may be dependent on the number of weak users in sector, which may change over time. A designated sector or the cell may receive loading information for various sectors, define the common and sector-specific sets, and inform the sectors of these sets. This embodiment may allow for better utilization of system resources based on the distribution of users.

To facilitate assignment of subbands to the terminals, multiple orthogonal "traffic" channels may be defined for each (common or sector-specific) subband set. For a given subband set, each subband is used for only one traffic channel in any given time interval, and each traffic channel may be assigned zero, one, or multiple subbands in each time interval. The traffic channels for each sector-specific set do not interfere with one another and do not interfere with the traffic channels for the common set(s) that are non-overlapping with the sector-specific set. Similarly, the traffic channels for each common set do not interfere with one another and do not interfere with the traffic channels for the sector-specific set(s) that are non-overlapping with the common set. A traffic channel may be viewed as a convenient way of expressing an assignment of subbands for different time intervals. A user may be assigned a traffic channel for a proper (common or sector-specific) subband set, depending on the user's channel condition.

The OFDMA system may or may not use frequency hopping (FH). With frequency hopping, a data transmission hops from subband to subband in a pseudo-random or deterministic manner. Frequency hopping can provide frequency diversity against deleterious path effects and randomization of interference from other cells/sectors.

Figure 9:
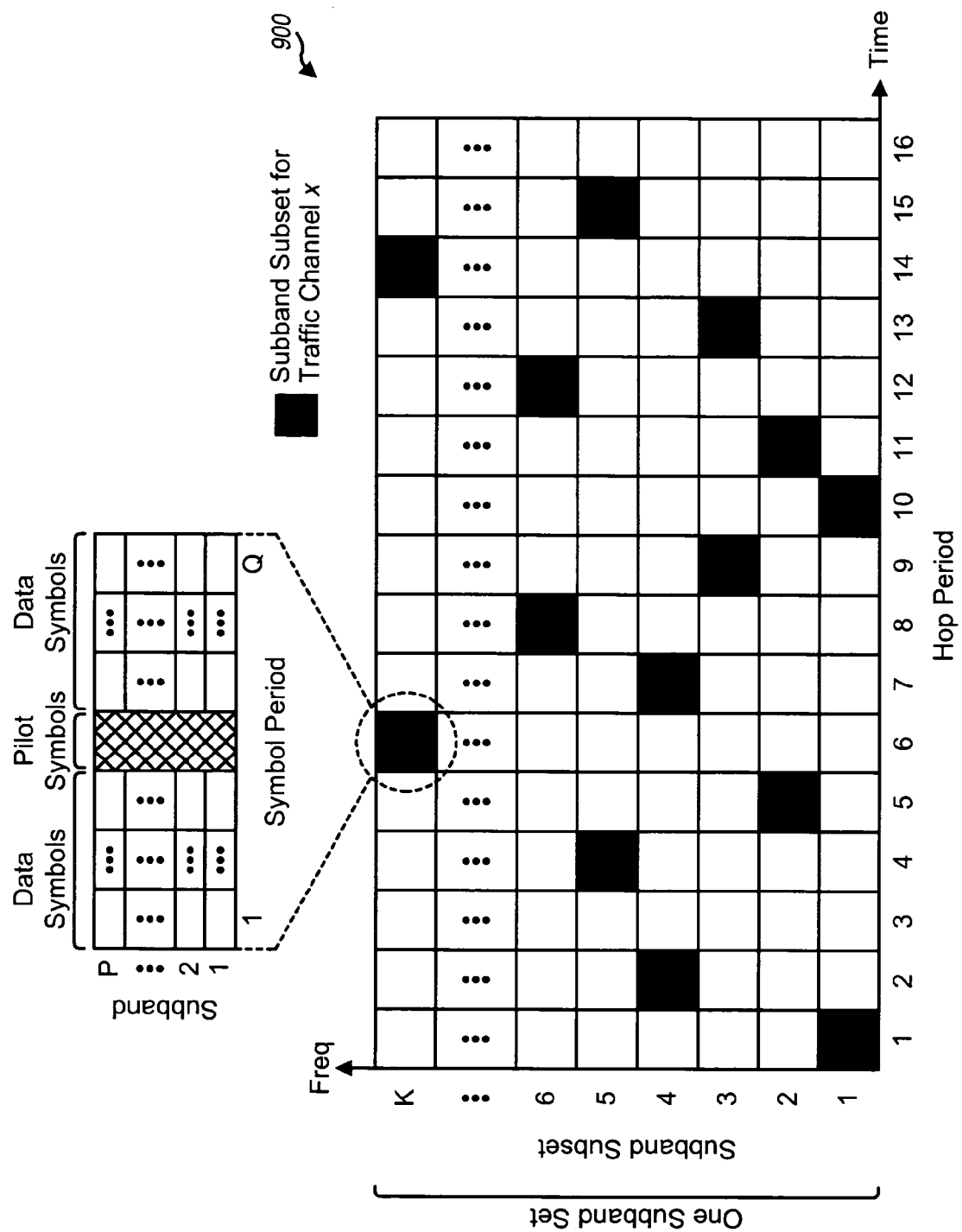
FIG. 9 illustrates a frequency hopping scheme.

FIG. 9 illustrates a frequency hopping scheme 900 that may be used for the forward and/or reverse link in an FH-OFDMA system. For the embodiment shown in FIG. 9, the subbands in a given (common or sector-specific) subband set is arranged into K subsets, and each subset contains P subbands, where K>1 and P≧1. The subbands in each subset may be contiguous subbands in the set (as shown in FIG. 9) or non-contiguous subbands (e.g., distributed across the set).

Each traffic channel for the subband set is associated with an FH pattern that indicates a specific subset of P subbands to use in each "hop" period. The FH pattern may also be called an FH sequence, a hop pattern, or some other terminology. A hop period is the amount of time spent on a given subset and spans Q OFDM symbol periods (or simply, "symbol periods"), where Q>1. The FH patterns for different traffic channels in the subband set are orthogonal to one another so that no two traffic channels use the same subband in any given hop period. This property avoids or minimizes intra-sector interference. The FH pattern for each traffic channel may pseudo-randomly select different subband subsets in different hop periods. Frequency diversity is achieved by selecting all or many of the subbands in the set over some number of hop periods. To randomize inter-sector interference, the FH patterns for each sector-specific set may be pseudo-random with respect to the FH patterns for other sector-specific sets.

Figure 10:
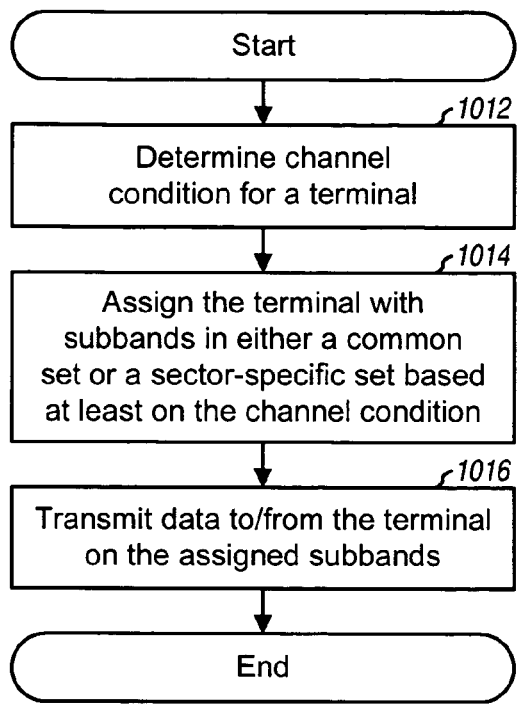
FIG. 10 shows a process for data transmission with intra-cell common reuse.

FIG. 10 shows a flow diagram of a process 1000 for transmitting data with intra-cell common reuse. Initially, the channel condition for a terminal in a given sector x is determined (block 1012). The channel condition may be ascertained in various manners as described below and may indicate whether the terminal is observing high interference from at least one other sector in the same cell. The terminal is assigned subbands in either a common set or a sector-specific set for sector x based at least on the channel condition for the terminal (block 1014). The common set and the sector-specific set are non-overlapping. The sector-specific set contains subbands that are allocable to the terminals in sector x. The common set contains subbands experiencing little interference, if any, from sector x and at least one other sector in the cell. Data for the terminal is processed and transmitted on the assigned subbands via the forward and/or reverse links (block 1016).

Each sector may assign subbands to its terminals in various manners. For example, multiple groups of terminals may be formed for each sector, one group of terminals for each set of subbands, and the terminals in each group may be assigned the subbands in the associated set. Each terminal may be classified into one of the multiple groups based on the channel condition for the terminal, the number of subbands in each set, the number of terminals sharing the subbands in each set, and so on. The terminals in each group may then be assigned the subbands in the associated set based on quality of service (QoS), system loading, fairness requirements, other information, and/or other considerations.

Figure 11:
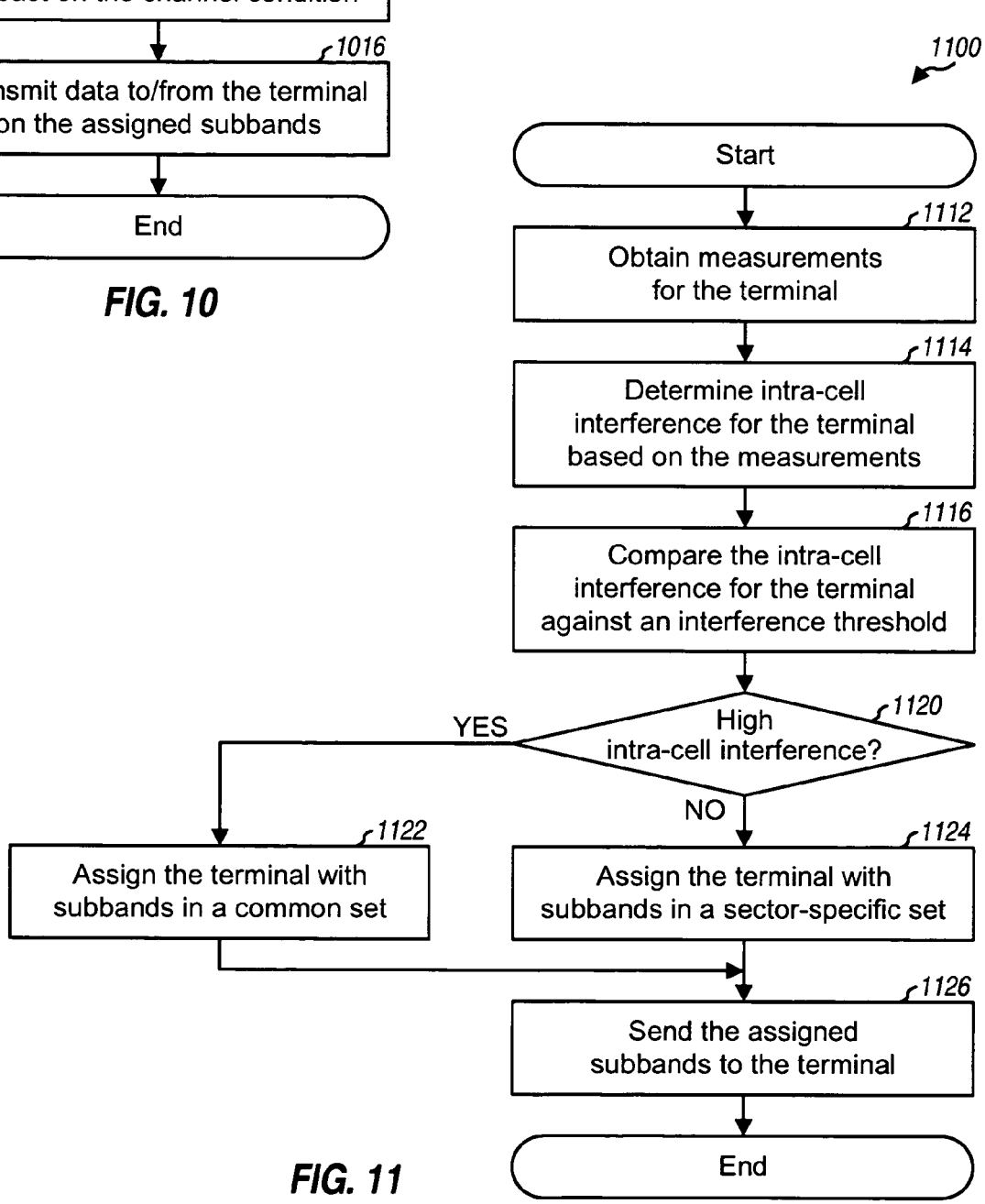
FIG. 11 shows a process for assigning subbands to a terminal.

FIG. 11 shows a flow diagram of a process 1100 for assigning subbands to the terminal. Process 1100 may be used for blocks 1012 and 1014 in FIG. 10 and may be performed by each sector in each scheduling interval, which may be any time interval. Initially, measurements are obtained by the terminal for different sectors and/or by different sectors for the terminal (block 1112). Each sector may transmit a pilot on the forward link, which may be used by the terminals in the system for signal detection, timing and frequency synchronization, channel estimation, and so on. A pilot is typically composed of known modulation symbols that are processed and transmitted in a known manner. The terminal may also transmit a pilot on the reverse link to facilitate data reception by the sectors. The measurements for the terminal may be based on the pilots transmitted by the sectors on the forward link, the pilot transmitted by the terminal on the reverse link, and/or some other transmission.

In one embodiment, the terminal searches for pilots transmitted by sectors in the system and reports a certain number of highest pilot measurements to the serving sector. In another embodiment, the terminal measures the interference observed for different subband sets, derives a channel quality indicator (CQI) for each subband set, and sends the CQIs for the different subband sets to the serving sector. The CQI indicates the received signal quality achieved by the terminal for the subband set. The received signal quality may be quantified by a signal-to-interference-and-noise ratio (SINR), an energy-per-chip-to-total-noise ratio (Ec/No), an energy-per-chip-to-noise ratio (Ec/Nt), a carrier-to-interference ratio (C/I), or some other signal quality metric. The CQI may be measured and reported in a shorter time than the pilot measurements, which would then allow for fast assignment of subbands and faster response to rapidly changing channel condition. In yet another embodiment, the sectors measure the pilot transmitted by the terminal and report the pilot measurements to the serving sector.

The intra-cell interference for the terminal is determined based on the measurements obtained for the terminal (block 1114). For the forward link, the intra-cell interference may be determined based on pilot measurements for all sectors in the same cell that are not designated to transmit to the terminal. For the reverse link, the intra-cell interference may be determined based on pilot measurements made by all sectors in the same cell for the terminal. The terminal may also measure the intra-cell interference and report the measurement to the serving sector. The intra-cell interference may also be deduced based on a position estimate for the terminal. The intra-cell interference may thus be determined in various manners and based on various measurements. In general, the intra-cell interference may be determined based on forward link and/or reverse link measurements. The forward and reverse links may be assumed to be reciprocal over the long term. In this case, a strong pilot measurement made by the terminal for a given sector on the forward link may imply that the sector will be a strong interferer on the forward link and will also receive strong interference from the terminal on the reverse link. The same reasoning also applies for reverse link pilot measurements.

The intra-cell interference for the terminal is compared against an interference threshold (block 1116). If the intra-cell interference exceeds the threshold, as determined in block 1120, then the terminal is assigned subbands from a common set (block 1122). Otherwise, the terminal is assigned subbands from the sector-specific set for the serving sector (block 1124). The assigned subbands are then sent to the terminal (block 1126). Blocks 1112 and 1114 may correspond to block 1012 in FIG. 10, and blocks 1116 through 1124 may correspond to block 1014.

In general, the terminal may be assigned subbands from the common set or the sector-specific set based on various factors such as, e.g., the intra-cell interference observed by the terminal, handoff requests for the terminal, quality of service (QoS) requirements, the priority of the terminal, and so on. The decision for using the common set or the sector-specific set may be determined based on direct or indirect inputs from different sectors (e.g., measurements for/from different sectors).

Figure 12:
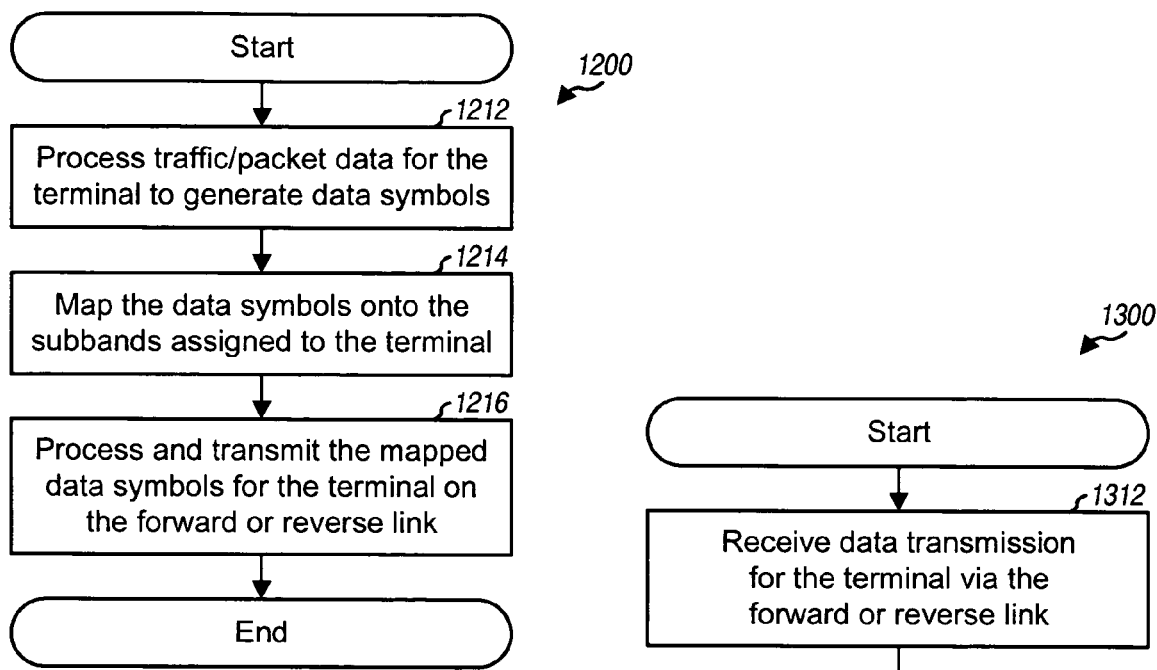
FIG. 12 shows a process for transmitting data on the assigned subbands.

FIG. 12 shows a flow diagram of a process 1200 for transmitting data on the subbands assigned to the terminal. Process 1200 may be used for data transmission on the forward and/or reverse link. Traffic data for the terminal is processed (e.g., encoded and symbol mapped) to generate data symbols (block 1212). As used herein, a "data" symbol is a modulation symbol for traffic data, a "pilot" symbol is a modulation symbol for pilot, and a modulation symbol is a complex value for a point in a signal constellation for a modulation scheme. The data symbols are mapped onto the subbands assigned to the terminal (block 1214). The mapped data symbols as well as pilot symbols and/or signaling are further processed and transmitted (1) from one or more sectors on the forward link to the terminal or (2) from the terminal to one or more sectors on the reverse link (block 1216).

Figure 13:
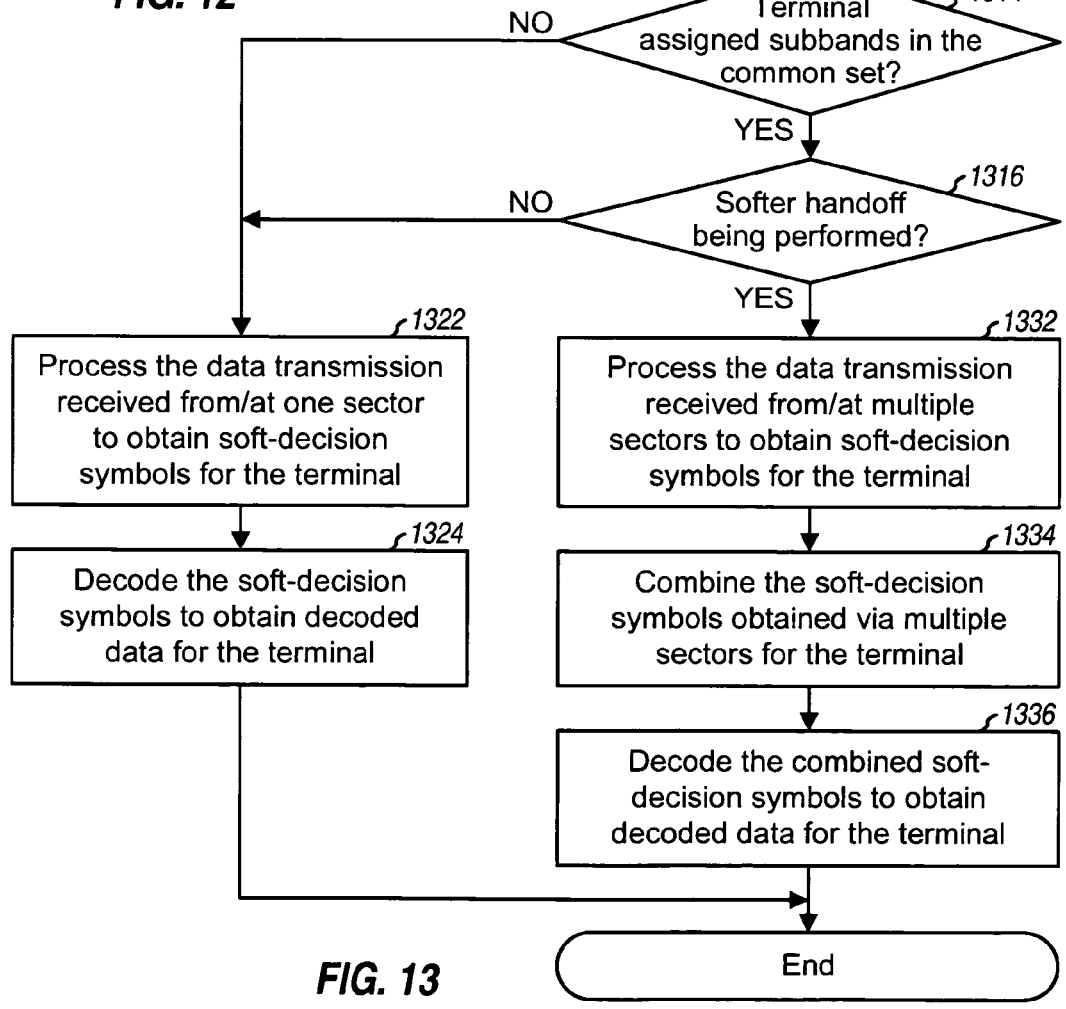
FIG. 13 shows a process for receiving data on the assigned subbands.

FIG. 13 shows a flow diagram of a process 1300 for receiving data on the subbands assigned to the terminal. Process 1300 may be used for data reception on the forward and/or reverse link. The data transmission for the terminal is received by (1) the terminal via the forward link or (2) the sectors via the reverse link (block 1312). A determination is then made whether the terminal has been assigned subbands in a common set or a sector-specific set (block 1314) and whether softer handoff is being performed for the terminal (block 1316). If the terminal is assigned subbands in the sector-specific set or if softer handoff is not being performed, then the data transmission received from/by one sector (the serving sector) is processed to obtain soft-decision symbols for the terminal (block 1322). A soft-decision symbol is a multi-bit value obtained by a receiver for a single-bit (or "hard") value sent by a transmitter, with the additional bits being used to capture uncertainty in the single-bit value due to noise and other artifacts. The soft-decision symbols for the terminal are then processed (e.g., detected and decoded) to obtain decoded data for the terminal (block 1324).

If the terminal is assigned subbands in the common set and if softer handoff is being performed, then the data transmission received from/by multiple sectors (the serving sector and at least one other sector) for the terminal is processed to obtain soft-decision symbols for each sector (block 1332). For forward link transmission, the terminal may combine the soft-decision symbols obtained for multiple sectors to derive combined soft-decision symbols having improved signal quality (block 1334). For reverse link transmission, the serving sector may receive soft-decision symbols obtained by other sectors for the terminal and combine the soft-decision symbols obtained by the different sectors to derive combined soft-decision symbols for the terminal (also block 1334). In any case, the combined soft-decision symbols for the terminal are decoded to obtain decoded data for the terminal (block 1336).

Figure 14:
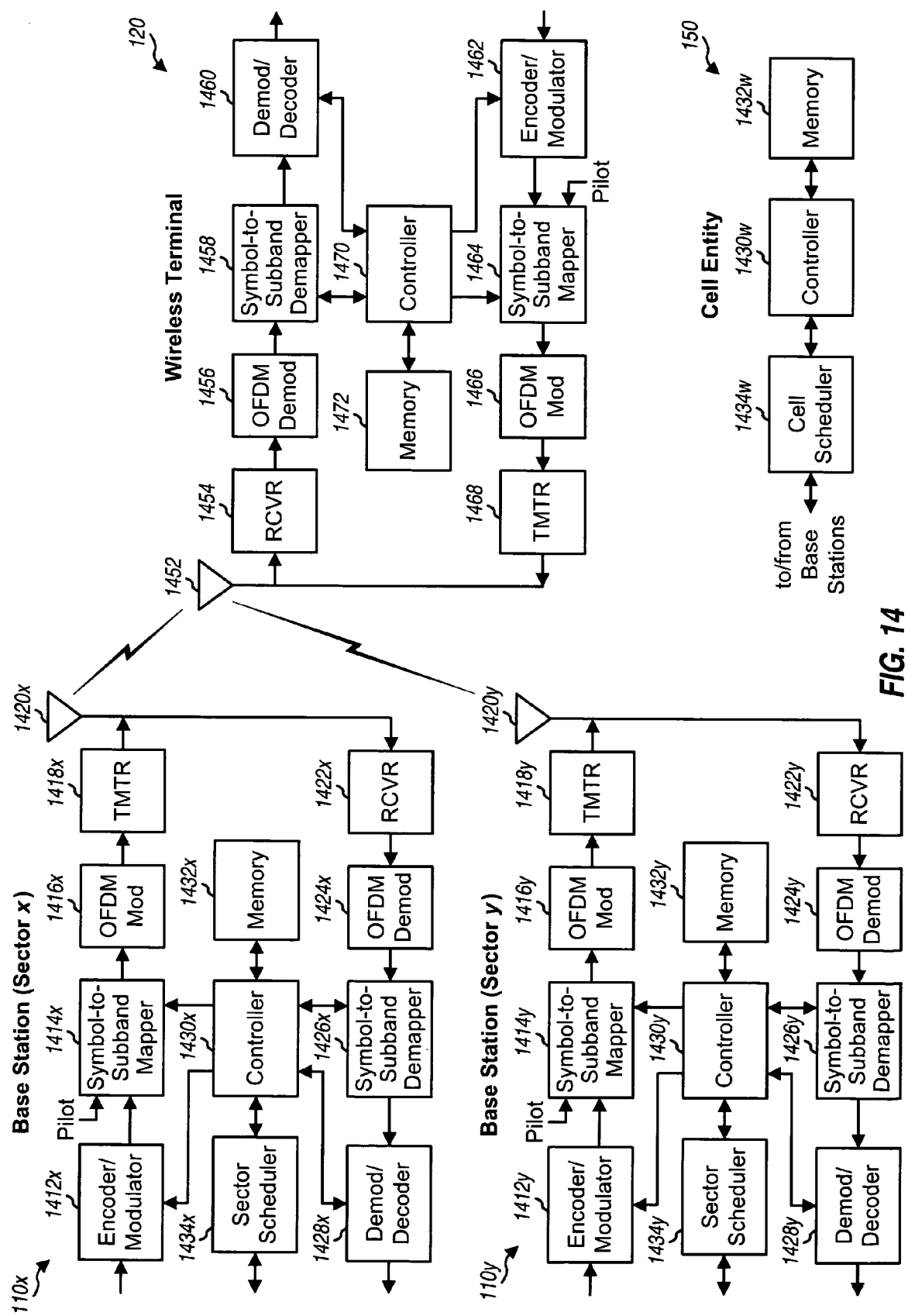
FIG. 14 shows two base stations, a cell entity, and a terminal.

FIG. 14 shows a block diagram of an embodiment of a base station 110x for sector x, a base station 100y for sector y, a wireless terminal 120, and a cell entity 150. Base stations 110x and 110y and cell entity 150 are network entities for one cell.

At base station 110x, an encoder/modulator 1412x receives traffic data for terminals being served by base station 110x, processes (e.g., encodes, interleaves, and symbol maps) the traffic data for each terminal based on a coding and modulation scheme selected for the terminal, and generates data symbols for each terminal. A symbol-to-subband mapper 1414x maps the data symbols for each terminal onto the subbands assigned to the terminal, as indicated by a control from a controller 1430x. Mapper 1414x also provides pilot symbols on subbands used for pilot transmission and a signal value of zero for each subband not used for transmission. For each OFDM symbol period, mapper 1414x provides N transmit symbols for the N total subbands, where each transmit symbol may be a data symbol, a pilot symbol, or a zero-signal value.

An OFDM modulator (Mod) 1416x receives N transmit symbols for each OFDM symbol period and generates a corresponding OFDM symbol. OFDM modulator 1416x typically includes an inverse fast Fourier transform (IFFT) unit and a cyclic prefix generator. For each OFDM symbol period, the IFFT unit transforms the N transmit symbols to the time domain with an N-point inverse FFT to obtain a "transformed" symbol that contains N time-domain chips. Each chip is a complex value to be transmitted in one chip period. The cyclic prefix generator then repeats a portion of each transformed symbol to form an OFDM symbol that contains N+C chips, where C is the number of chips being repeated. The repeated portion is often called a cyclic prefix and is used to combat inter-symbol interference (ISI) caused by frequency selective fading. An OFDM symbol period corresponds to the duration of one OFDM symbol, which is N+C chip periods. OFDM modulator 1416x provides a stream of OFDM symbols. A transmitter unit (TMTR) 1418x processes (e.g., converts to analog, filters, amplifies, and frequency upconverts) the OFDM symbol stream to generate a modulated signal, which is transmitted from an antenna 1420x.

At terminal 120, the modulated signal(s) transmitted by one or more base stations are received by an antenna 1452, and the received signal is provided to and processed by a receiver unit (RCVR) 1454 to generate samples. The set of samples for one OFDM symbol period represents one received OFDM symbol. An OFDM demodulator (Demod) 1456 processes the samples and provides received symbols, which are noisy estimates of the transmit symbols sent by the base stations. OFDM demodulator 1456 typically includes a cyclic prefix removal unit and an FFT unit. The cyclic prefix removal unit removes the cyclic prefix in each received OFDM symbol to obtain a received transformed symbol. The FFT unit transforms each received transformed symbol to the frequency domain with an N-point FFT to obtain N received symbols for the N total subbands. A subband-to-symbol demapper 1458 obtains the N received symbols for each OFDM symbol period and provides received symbols for the subbands assigned to terminal 120, as indicated by a control from a controller 1470. A demodulator/decoder 1460 processes (e.g., detects, deinterleaves, and decodes) the received symbols for terminal 120 and provides decoded data for the terminal.

For reverse link transmission, at terminal 120, traffic data is processed by an encoder/modulator 1462, mapped onto subbands assigned to terminal 120 by a symbol-to-subband mapper 1464, further processed by an OFDM modulator 1466, conditioned by a transmitter unit 1468, and transmitted via antenna 1452. At base station 110x, the modulated signals from terminal 120 as well as other terminals are received by antenna 1420x, conditioned by a receiver unit 1422x, and processed by an OFDM demodulator 1424x. A symbol-to-subband demapper 1426x obtains the N received symbols for each OFDM symbol period and provides received symbols for each terminal from the subbands assigned to the terminal. A demodulator/decoder 1428x processes the received symbols for each terminal and provides decoded data for the terminal.

Base station 110y processes and transmits data on the forward link to terminals in communication with base station 110y and also receives data on the reverse link from these terminals. The processing by base station 110y is similar to the processing by base station 110x. The base stations for the same cell may exchange soft-decision symbols for softer handoff users, which is not shown in FIG. 14.

In one embodiment of intra-cell common reuse, controller 1430 at each base station 110 identifies terminals desiring data transmission on the forward and/or reverse link, ascertains the channel condition for each terminal, and determines whether each terminal should be assigned subbands in a common set or a sector-specific set. The channel condition for each terminal may be ascertained based on reverse link measurements made by base station 110 or forward link measurements made by the terminal and reported back to the base station. A sector scheduler 1434 at each base station then assigns subbands (or traffic channels) in the sector-specific set to terminals and schedules these terminals for data transmission on the forward and/or reverse links. Each base station then provides each scheduled terminal with its assigned traffic channel, e.g., via over-the-air signaling. A cell scheduler 1434w within cell entity 150 assigns subbands (or traffic channels) in the common set(s) for the cell to terminals and schedules these terminals for data transmission. Cell scheduler 1434w may communicate with sector schedulers 1434x and 1434y to coordinate the scheduling of terminals in the cell. In another embodiment, a single scheduler schedules all terminals in the cell for data transmission on the forward and reverse links. The assignment of subbands to terminals for forward and/or reverse link transmission may also be performed in various other manners.

Controllers 1430x, 1430y, 1430w, and 1470 direct the operation at base stations 110x and 110y, cell entity 150, and terminal 120, respectively. Memory units 1432x, 1432y, 1432w, and 1472 store program codes and data used by controller 1430x, 1430y, 1430w, and 1470, respectively. Controllers 1430x and 1430y may also perform other processing for data transmission and reception, such as generating the FH patterns for each terminal in communication with base stations 110x and 110y, respectively. Controller 1470 may generate the FH pattern for terminal 120 based on the assigned traffic channel.

For clarity, intra-cell common reuse has been specifically described for a system with 3-sector cells. In general, intra-cell common reuse may be used with any number of sectors. For a cell with R sectors, where R>1, one common set may be formed for all sectors (for the first embodiment) or multiple common sets may be formed for different combinations of sectors (for the second and third embodiments). The sector-specific set for each sector may be formed based on the common set(s) defined for the cell.

The above description for intra-cell common reuse is for a single cell. As noted above, a system typically includes many cells. Intra-cell common reuse may be applied in various manners for the cells in the system. To randomize inter-cell interference, the FH patterns for the sector-specific set(s) in each cell may be pseudo-random with respect to the FH patterns for the sector-specific set(s) in neighboring cells. The common set(s) for different cells may be defined and operated in various manners.

In one embodiment, the same common set(s) are used for all cells in the system. The same FH patterns may be used for the common set(s) in neighboring cells. This can simplify soft handoff between cells. Alternatively, the common set(s) may be defined with both common and pseudo-random FH patterns for different neighboring cells. The common FH patterns may be used to support soft handoff between different cells. The pseudo-random FH patterns can randomize interference observed by users in different cells assigned with subbands in the common set(s). This embodiment simplifies frequency planning for the system. Furthermore, sufficient interference averaging or diversity may be achieved if the common set(s) are sufficiently large so that each user does not frequently collide with the same strong interferers. In another embodiment, the common set(s) for neighboring cells are non-overlapping. For this embodiment, users assigned with subbands in the common set(s) in one cell observe randomized interference from users in neighboring cells. This embodiment may provide better interference diversity, especially for small common set sizes. In yet another embodiment, the common set(s) for each cell are pseudo-random with respect to the common set(s) for neighboring cells. This embodiment may also provide good interference diversity. Each cell may communicate with neighboring cells to form the common and sector-specific sets and/or to exchange set information.

Intra-cell common reuse has also been described for an OFDMA system. Intra-cell common reuse may also be used for a Time Division Multiple Access (TDMA) system, a Frequency Division Multiple Access (FDMA) system, a Code Division Multiple Access (CDMA) system, a multi-carrier CDMA system, and so on. A TDMA system uses time division multiplexing (TDM), and transmissions for different users are orthogonalized by transmitting in different time intervals. An FDMA system uses frequency division multiplexing (FDM), and transmissions for different users are orthogonalized by transmitting in different frequency channels or subbands. In general, the available system resources (e.g., frequency subbands/channels, time slots, and so on) may be arranged into common and sector-specific sets. Each sector may assign the system resources in the common and sector-specific sets to the users as described above.

Intra-cell common reuse may also be used for a Global System for Mobile Communications (GSM) system. A GSM system may operate in one or more frequency bands. Each frequency band covers a specific range of frequencies and is divided into a number of 200 kHz radio frequency (RF) channels. Each RF channel is identified by a specific ARFCN (absolute radio frequency channel number). For example, the GSM 900 frequency band covers ARFCNs 1 through 124, the GSM 1800 frequency band covers ARFCNs 512 through 885, and the GSM 1900 frequency band covers ARFCNs 512 through 810. Intra-cell common reuse may be used to improve efficiency and reduce intra-cell interference. The available RF channels for the GSM system may be arranged into common and sector-specific sets. Each GSM sector (which is commonly called "GSM cell") may then assign RF channels in its sector-specific set to strong and fair users and RF channels in the common set to weak users. Intra-cell common reuse may allow each GSM cell to use a larger percentage of the available RF channels to achieve greater spectral efficiency.

The intra-cell common reuse techniques described herein may be implemented by various means. For example, these techniques may be implemented in hardware, software, or a combination thereof. For a hardware implementation, the processing units used to support intra-cell common reuse at a base station may be implemented with one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to support intra-cell common reuse at a terminal may also be implemented with one or more ASICs, DSPs, and so on.

For a software implementation, the intra-cell common reuse techniques may be implemented with modules (e.g., procedures, functions, and so on) that perform the functions described herein. The software codes may be stored in a memory unit (e.g., memory unit $1432x$, $1432y$, $1432w$, or $1472$ in FIG. 14) and executed by a processor (e.g., controller $1430x$, $1430y$, $1430w$, or $1470$). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of assigning system resources in a wireless communication system, comprising:
    determining channel condition for a terminal; and
    assigning the terminal with system resources from at least one of a first set and a common set based at least on the channel condition for the terminal and a group of a plurality of groups to which the terminal is classified into based on the channel condition for the terminal,
    the first set formed of first set system resources and the common set formed of common set system resources, wherein the first set system resources and common set system resources are mutually exclusive;
    the first set including system resources allocable to terminals in a first sector of a cell, and the common set including available system resources with reduced interference from the first sector and at least one other sector in the cell, wherein the determining the channel condition for the terminal comprises obtaining pilot measurements for the terminal, and determining amount of interference observed by the terminal from the at least one other sector based on the pilot measurements, and wherein the terminal is assigned system resources from the common set if the terminal observes high interference from the at least one other sector.

2. A method of assigning system resources in a wireless communication system, comprising:
    determining channel condition for a terminal; and
    assigning the terminal with system resources from at least one of a first set and a common set based at least on the channel condition for the terminal and a group of a plurality of groups to which the terminal is classified into based on the channel condition for the terminal,
    the first set formed of first set system resources and the common set formed of common set system resources, wherein the first set system resources and common set system resources are mutually exclusive;
    the first set including system resources allocable to terminals in a first sector of a cell, and the common set including available system resources with reduced interference from the first sector and at least one other sector in the cell, and
    wherein the wireless communication system is an orthogonal frequency division multiple access (OFDMA) system utilizing frequency hopping, wherein a first plurality of frequency hopping (FH) patterns are defined for the first set and a second plurality of frequency hopping (FH) patterns are defined for the common set, and wherein the terminal is assigned an FH pattern selected from the first or second plurality of FH patterns.

3. A method of transmitting data in a wireless communication system comprising:

obtaining an assignment of system resources for a terminal, the system resources assigned to the terminal being selected from at least one of a first set and a common set based at least on channel condition for the terminal and a group of a plurality of groups to which the terminal is classified into based on the channel condition for the terminal, the first set formed of first set system resources and the common set formed of common set system resources, wherein the first set system resources and common set system resources are mutually exclusive;

the first set including system resources allocable to terminals in a first sector of a cell, and the common set including system resources with reduced interference from the first sector and at least one other sector in the cell;

generating a control indicative of the system resources assigned to the terminal, wherein the terminal is assigned system resources from the common set, and wherein data is sent to the terminal from at least two base stations for at least two sectors;

receiving data transmissions from the at least two base stations; processing the received data transmission from each base station to obtain soft-decision symbols for the base station; combining soft-decision symbols obtained for the at least two base stations; and decoding combined soft-decision symbols to obtain decoded data for the terminal.

4. A method of transmitting data in a wireless communication system comprising:

obtaining an assignment of system resources for a terminal, the system resources assigned to the terminal being selected from at least one of a first set and a common set based at least on channel condition for the terminal and a group of a plurality of groups to which the terminal is classified into based on the channel condition for the terminal, the first set formed of first set system resources and the common set formed of common set system resources, wherein the first set system resources and common set system resources are mutually exclusive;

the first set including system resources allocable to terminals in a first sector of a cell, and the common set including system resources with reduced interference from the first sector and at least one other sector in the cell;

generating a control indicative of the system resources assigned to the terminal, wherein the terminal is assigned system resources from the common set, and wherein data is sent by the terminal to at least two base stations for at least two sectors;

receiving a data transmission from the terminal by the at least two base stations; processing the received data transmission at each base station to obtain soft-decision symbols for the terminal; combining soft-decision symbols obtained for the terminal by the at least two base stations; and decoding the combined soft-decision symbols to obtain decoded data for the terminal.

5. A method for assigning system resources in a wireless communication system, comprising:

using a controller for determining channel condition for a terminal; and assigning the terminal with system resources from both a first set and a common set based at least on the channel condition for the terminal and a group of a plurality of groups to which the terminal is classified into based on the channel condition for the terminal, the first set formed of first set system resources and the common set formed of common set system resources, wherein the first set system resources and common set system resources are mutually exclusive and are static; and the first set including system resources allocable to terminals in a first sector of a cell, and the common set including available system resources with reduced interference from the first sector and at least one other sector in the cell, wherein the cell includes the first sector and second and third sectors, wherein the common set includes system resources with reduced interference, if any, from the first and second sectors in the cell, and wherein the system resources in the common set are included in a second set of system resources allocable to terminals in the third cell.

6. A method of for assigning system resources in a wireless communication system, comprising:

using a controller for determining channel condition for a terminal; and assigning the terminal with system resources from both a first set and a common set based at least on the channel condition for the terminal and a group of a plurality of groups to which the terminal is classified into based on the channel condition for the terminal, the first set formed of first set system resources and the common set formed of common set system resources, wherein the first set system resources and common set system resources are mutually exclusive and are static; and the first set including system resources allocable to terminals in a first sector of a cell, and the common set including available system resources with reduced interference from the first sector and at least one other sector in the cell, wherein the determining the channel condition for the terminal comprises obtaining pilot measurements for the terminal, and determining amount of interference observed by the terminal from the at least one other sector based on the pilot measurements, and wherein the terminal is assigned system resources from the common set if the terminal observes high interference from the at least one other sector.

7. A method of for assigning system resources in a wireless communication system, comprising:

using a controller for determining channel condition for a terminal; and assigning the terminal with system resources from both a first set and a common set based at least on the channel condition for the terminal and a group of a plurality of groups to which the terminal is classified into based on the channel condition for the terminal, the first set formed of first set system resources and the common set formed of common set system resources, wherein the first set system resources and common set system resources are mutually exclusive and are static; and the first set including system resources allocable to terminals in a first sector of a cell, and the common set including available system resources with reduced interference from the first sector and at least one other sector in the cell, wherein the wireless communication system is an orthogonal frequency division multiple access (OFDMA) system utilizing frequency hopping, wherein a first plurality of frequency hopping (FH) patterns are defined for the first set and a second plurality of frequency hopping (FH) patterns are defined for the common set, and wherein the terminal is assigned an FH pattern selected from the first or second plurality of FH patterns.

8. An apparatus for assigning system resources in a wireless communication system, comprising:
   a controller for determining channel condition for a terminal; and
   a scheduler for assigning the terminal with system resources from both a first set and a common set based at least on the channel condition for the terminal and a group of a plurality of groups to which the terminal is classified into based on the channel condition for the terminal,
   the first set formed of first set system resources and the common set formed of common set system resources, wherein the first set system resources and common set system resources are mutually exclusive and are static; and
   the first set including system resources allocable to terminals in a first sector of a cell, and the common set including available system resources with reduced interference from the first sector and at least one other sector in the cell,
   wherein the cell includes the first sector and second and third sectors, and wherein the common set includes system resources with reduced interference, if any, from the first and second sectors in the cell, and
   wherein the system resources in the common set are included in a second set of system resources allocable to terminals in the third cell.

9. An apparatus for assigning system resources in a wireless communication system, comprising:
   a controller for determining channel condition for a terminal; and
   a scheduler for assigning the terminal with system resources from both a first set and a common set based at least on the channel condition for the terminal and a group of a plurality of groups to which the terminal is classified into based on the channel condition for the terminal,
   the first set formed of first set system resources and the common set formed of common set system resources, wherein the first set system resources and common set system resources are mutually exclusive and are static; and
   the first set including system resources allocable to terminals in a first sector of a cell, and the common set including available system resources with reduced interference from the first sector and at least one other sector in the cell,
   wherein the controller further performs obtaining pilot measurements for the terminal, and determining amount of interference observed by the terminal from the at least one other sector based on the pilot measurements, and wherein the terminal is assigned system resources from the common set if the terminal observes high interference from the at least one other sector.

10. An apparatus for assigning system resources in a wireless communication system, comprising:
    a controller for determining channel condition for a terminal; and
    a scheduler for assigning the terminal with system resources from both a first set and a common set based at least on the channel condition for the terminal and a group of a plurality of groups to which the terminal is classified into based on the channel condition for the terminal,
    the first set formed of first set system resources and the common set formed of common set system resources, wherein the first set system resources and common set system resources are mutually exclusive and are static; and
    the first set including system resources allocable to terminals in a first sector of a cell, and the common set including available system resources with reduced interference from the first sector and at least one other sector in the cell,
    wherein the wireless communication system is an orthogonal frequency division multiple access (OFDMA) system utilizing frequency hopping, wherein a first plurality of frequency hopping (FH) patterns are defined for the first set and a second plurality of frequency hopping (FH) patterns are defined for the common set, and wherein the terminal is assigned an FH pattern selected from the first or second plurality of FH patterns.

11. An apparatus for assigning system resources in a wireless communication system, comprising:
    means for determining channel condition for a terminal; and
    means for assigning the terminal with system resources from both a first set and a common set based at least on the channel condition for the terminal and a group of a plurality of groups to which the terminal is classified into based on the channel condition for the terminal,
    the first set formed of first set system resources and the common set formed of common set system resources, wherein the first set system resources and common set system resources are mutually exclusive and are static; and
    the first set including system resources allocable to terminals in a first sector of a cell, and the common set including available system resources with reduced interference from the first sector and at least one other sector in the cell,
    wherein the cell includes the first sector and second and third sectors, and wherein the common set includes system resources with reduced interference, if any, from the first and second sectors in the cell, and
    wherein the system resources in the common set are included in a second set of system resources allocable to terminals in the third cell.

12. An apparatus for assigning system resources in a wireless communication system, comprising:
    means for determining channel condition for a terminal; and
    means for assigning the terminal with system resources from both a first set and a common set based at least on the channel condition for the terminal and a group of a plurality of groups to which the terminal is classified into based on the channel condition for the terminal,
    the first set formed of first set system resources and the common set formed of common set system resources, wherein the first set system resources and common set system resources are mutually exclusive and are static; and
    the first set including system resources allocable to terminals in a first sector of a cell, and the common set including available system resources with reduced interference from the first sector and at least one other sector in the cell, means for obtaining pilot measurements for the terminal, and means for determining amount of interference observed by the terminal from the at least one other sector based on the pilot measurements, and wherein the terminal is assigned system resources from the common set if the terminal observes high interference from the at least one other sector.

13. An apparatus for assigning system resources in a wireless communication system, comprising:

means for determining channel condition for a terminal; and means for assigning the terminal with system resources from both a first set and a common set based at least on the channel condition for the terminal and a group of a plurality of groups to which the terminal is classified into based on the channel condition for the terminal, the first set formed of first set system resources and the common set formed of common set system resources, wherein the first set system resources and common set system resources are mutually exclusive and are static; and the first set including system resources allocable to terminals in a first sector of a cell, and the common set including available system resources with reduced interference from the first sector and at least one other sector in the cell, wherein the wireless communication system is an orthogonal frequency division multiple access (OFDMA) system utilizing frequency hopping, wherein a first plurality of frequency hopping (FH) patterns are defined for the first set and a second plurality of frequency hopping (FH) patterns are defined for the common set, and wherein the terminal is assigned an FH pattern selected from the first or second plurality of FH patterns.

\* \* \* \* \*